US012590734B2

(12) United States Patent (10) Patent No.: US 12,590,734 B2
Hamanah et al. (45) Date of Patent: Mar. 31, 2026

(54) DRIVE TRACKING SYSTEM

(71) Applicant: KING FAHD UNIVERSITY OF PETROLEUM AND MINERALS, Dhahran (SA)

(72) Inventors: Waleed Mohammed Abdo Hamanah, Dhahran (SA); Mohamed Ali Abido, Dhahran (SA); Aboubakr Salem Mohammed Salem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 609 days.

(21) Appl. No.: 18/152,564

(22) Filed: Jan. 10, 2023

(65) Prior Publication Data

US 2024/0230164 A1 Jul. 11, 2024

(51) Int. Cl.
*F24S 50/20* (2018.01)
*H02S 20/32* (2014.01)

(52) U.S. Cl.
CPC ........... *F24S 50/20* (2018.05); *F24S 2050/25* (2018.05); *H02S 20/32* (2014.12)

(58) Field of Classification Search
None
See application file for complete search history.

(56) References Cited

U.S. PATENT DOCUMENTS 4,519,382 A * 5/1985 Gerwin ................... F24S 20/20
126/578
9,027,545 B2 5/2015 Devillier
(Continued)

FOREIGN PATENT DOCUMENTS

CA 3212591 A1 * 10/2022 ............. H05B 7/144
CN 101266078 A * 9/2008
(Continued)

OTHER PUBLICATIONS

Hamanah, et al. ; Heliostat Dual-Axis Sun Tracking System: A Case Study in KSA ; 18th International Conference on Renewable Energies and Power Quality (ICREPQ'20) ; vol. No. 18 ; Jun. 2020 ; 6 Pages.

(Continued)

*Primary Examiner* — Jorge A Pereiro
(74) *Attorney, Agent, or Firm* — Oblon, McClelland, Maier & Neustadt, L.L.P.

(57) ABSTRACT

A drive tracking system including a heliostat structure, a power electronic converter, and a tracking controller. The heliostat structure includes a heliostat support frame, a plurality of linear actuators, and a heliostat facet. A first end of each of the plurality of linear actuators is connected to an underside of the heliostat facet and a second end of each of the plurality of linear actuators is connected to the heliostat support frame. The power electronic converter includes a plurality of direct current (DC) chopper converters mechanically coupled to the plurality of linear actuators via a worm gear system. The worm gear system includes a plurality of worm gears and a plurality of linear screws. The tracking controller includes a three-axis gyroscopic sensor and a (Continued)

microcontroller. The microcontroller has instructions to control the DC choppers based on data provided by the three-axis gyroscopic sensor.

13 Claims, 23 Drawing Sheets

(56) References Cited

U.S. PATENT DOCUMENTS

| 10,168,412 | B2 | 1/2019 | Plourde et al. | |
| 2005/0279953 | A1* | 12/2005 | Gerst | G02B 23/16 |
| | | | | 250/548 |
| 2010/0026369 | A1 | 2/2010 | Hofmayer et al. | |
| 2010/0180883 | A1* | 7/2010 | Oosting | F24S 50/20 |
| | | | | 126/604 |
| 2012/0216852 | A1* | 8/2012 | Almy | H02S 20/32 |
| | | | | 136/246 |
| 2013/0032135 | A1* | 2/2013 | Waterhouse | F24S 50/20 |
| | | | | 33/365 |
| 2014/0090263 | A1* | 4/2014 | Barton | F24S 30/425 |
| | | | | 33/645 |
| 2014/0182577 | A1* | 7/2014 | Linderman | F24S 50/20 |
| | | | | 126/593 |
| 2014/0201109 | A1* | 7/2014 | Tilley | F24S 50/20 |
| | | | | 700/297 |
| 2018/0172122 | A1* | 6/2018 | Parmar | E02F 9/2095 |
| 2023/0170841 | A1* | 6/2023 | Li | H02S 20/32 |
| | | | | 136/244 |

FOREIGN PATENT DOCUMENTS

| CN | 104156003 | A | * | 11/2014 | |
| CN | 106382756 | A | * | 2/2017 | G05D 3/12 |
| CN | 106444854 | A | * | 2/2017 | G05D 3/20 |
| EP | 2708832 | A1 | * | 3/2014 | F24S 30/455 |
| IN | 2014CH05489 | A | * | 7/2016 | |
| IN | 201405489-14 | | * | 7/2016 | |
| JP | 2013513817 | A | * | 4/2013 | F24S 30/452 |
| WO | 2010085592 | A2 | | 7/2010 | |
| WO | WO-2012120567 | A1 | * | 9/2012 | H02M 5/458 |

OTHER PUBLICATIONS

Sattler, et al. ; Review of heliostat calibration and tracking control methods ; Solar Energy 207 ; Jun. 30, 2020 ; 23 Pages.

* cited by examiner

400

404

402

402

406

1000

1100

1300

1502

1504

1506

1508

1510

1512

DRIVE TRACKING SYSTEM

STATEMENT REGARDING PRIOR DISCLOSURES BY THE INVENTOR(S)

Aspects of this technology are described by Hamanah, W. M., Salem, A. S., Abido, M. A., Al-Sulaiman, F. A., Qwbaiban, A. M., and Habetler, T. G., "Modeling, Implementing, and Evaluating of an Advanced Dual Axis Heliostat Drive System." ASME. *J. Sol. Energy Eng.* August 2022; 144(4): 041001. doi.org/10.1115/1.4052958

STATEMENT OF ACKNOWLEDGEMENT

This research was supported by King Fahd University of Petroleum and Minerals under the project number GTEC1701.

BACKGROUND

Technical Field

The present disclosure is directed to modeling, implementing, and evaluating an advanced dual axis heliostat drive system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With global population growth energy demand is increasing to meet the population's basic needs. Renewable energy sources are preferable over non-renewable energy sources (fossil fuels) and have become the mainstream of development. Renewable energy sources, such as solar energy, are currently an alternative energy source to fossil fuels. Solar energy is converted into electrical energy using a photovoltaic (PV) system. Solar Power Tower (SPT) technology is employed to increase a PV system's efficiency. SPT technology uses an array of flat, movable mirrors (called heliostats) to focus the sun's rays onto a collector tower (the target) to generate electrical power. SPT's efficiency depends on the heliostats' ability to accurately reflect sunlight onto the receiver. The SPT system requires an accurate drive system to move the heliostat over a wide range of angles. Also, the uneven energy distribution on a central receiver can cause thermal gradients and potential damage. To avoid the thermal gradients and potential damage, accurate heliostat tracking is required.

For proper heliostat tracking, an interaction between the heliostat electromechanical and control systems is recommended that employs several accurate mathematical models for determining the relationship between the position/direction of the heliostat and the sun. Corresponding components including an electric motor, lead screw, and heliostat facet must be considered. In an existing integrated model for the heliostat, a linear actuator based on elevation-axis tracking is employed. However, dual axes are more efficient in terms of increasing the collecting heat energy amount of the solar power system. The conventional dual-axis solar tracking systems are based on azimuth/elevation control that require several corrections to describe angles, as well as to integrate the data into a geographic information system (GIS).

In another conventional tracking system, a beam feedback sensor for generating an alignment error signal is used. However, this tracking system requires an accurate installation of the beam feedback sensor between the heliostat and the receiver, thereby allowing any misdirection of the reflected light to be detected. In another scenario, to increase the accuracy of the tracking system, four cameras are installed around the tower receiver at the top, bottom, left, and right, all of which serve as a receiver feedback controller that faces the heliostat field and simultaneously photographs the heliostat unit during each feedback interval. However, this setup requires a considerable number of components, leading to a complex and costly system that requires regular maintenance.

Accordingly, it is one object of the present disclosure to provide a drive tracking system that that achieves high tracking performance in an accurate and cost-efficient manner.

SUMMARY

In an exemplary embodiment, a drive tracking system is disclosed. The system includes a heliostat structure, a power electronic converter, and a tracking controller. The heliostat structure includes a heliostat support frame, a plurality of linear actuators, and a heliostat facet. The heliostat facet being further defined as a surface which can receive a variety of structures and devices affixed to its surface. A first end of each of the plurality of linear actuators is connected to an underside of the heliostat facet and a second end of each of the plurality of linear actuators is connected to the heliostat support frame. The power electronic converter includes a plurality of worm gears and a plurality of linear screws. The tracking controller is comprised of a three-axis gyroscopic sensor and a microcontroller. The three-axis gyroscopic sensor is mounted on a rear surface of the heliostat facet. The three-axis gyroscopic sensor is wired to the microcontroller. The microcontroller is configured with instructions to control the plurality of DC choppers converters based on data provided by the three-axis gyroscopic sensor.

In another exemplary embodiment, a method of closed-loop heliostat control is disclosed. The method includes determining an orientation of a heliostat facet with a three-axis gyroscope, the orientation comprising a combination of a rotation along an azimuth axis and a rotation along an elevation axis. The method includes transferring the orientation of the heliostat facet to the circuitry of a microcontroller. The method includes outputting, with the microcontroller, a pulse-width modulation signal to a plurality of DC choppers. The method further includes altering the speed of a plurality of linear actuators with the plurality of DC choppers in response to the pulse-width modulation signal, thereby orientating the heliostat facet via changing the elevation, and the azimuth of the heliostat facet. The method includes determining the orientation of the heliostat facet.

In another exemplary embodiment, a heliostat field control system is disclosed. The system includes a receiver, a plurality of heliostats, a solar power tower, and a heliostat drive system. The receiver locates a focal point at a top of the solar power tower. The plurality of heliostats is orientated to direct a beam of sunlight to the focal point of the solar power tower. The orientation of the plurality of heliostats being determined by the heliostat drive system. The heliostat drive system is in communication with the plurality of heliostats. The heliostat drive system includes a power supply converter and a closed-loop heliostat circuit. The closed-loop heliostat circuit determines the orientation of at least one of the plurality of heliostats. The closed-loop heliostat circuit receives a local-feedback signal from the plurality of heliostats, a reference input signal, and a beam feedback signal. The system of heliostat field control receives a target feedback signal from the receiver. The system of heliostat field control outputs the reference input signal to the heliostat drive system.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
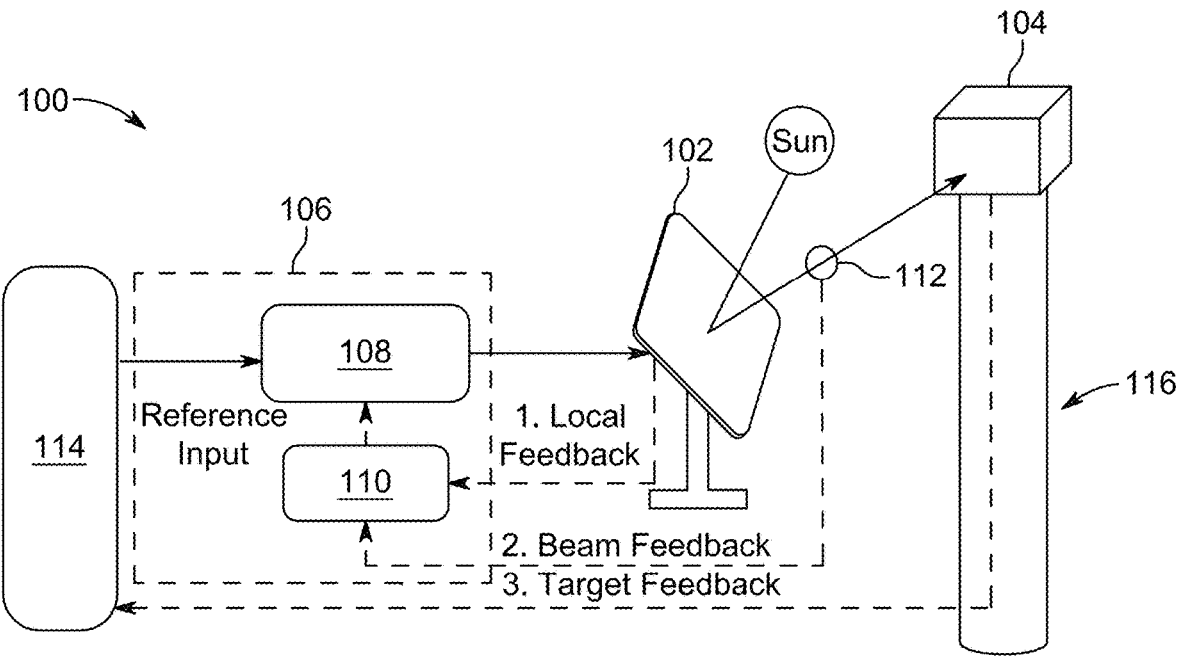
FIG. 1 illustrates a heliostat field control system, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a heliostat drive system for a solar power tower (SPT) electrical generation plant. The heliostat drive system is based on dual-axis tracking that employs a controller drive system. The controller drive system includes an angle sensor. Simulation and experimental results were conducted to assess the efficiency and accuracy of the controller drive system and validate the heliostat drive system. In an example, the heliostat drive system was evaluated in the Dhahran region of Saudi Arabia under different operating conditions. Results from a combination of both simulated and experimental trials demonstrated the dual-axis heliostat drive system's effectiveness in sun tracking and following sunbeams throughout the year. In an aspect, the dual-axis heliostat uses a class-E direct current chopper and an inexpensive gyro angle sensor.

FIG. 1 illustrates a heliostat field control system, according to aspects of the present disclosure (hereinafter interchangeably referred to as "system 100"). As shown in FIG. 1, the system 100 includes a plurality of heliostats 102 (a single heliostat has been shown as an example for brevity), a receiver 104, a heliostat drive system 106, a heliostat field control system 114, and a solar power tower 116. The receiver 104 is located at a focal point at a top of the solar power tower 116. In an aspect, the plurality of heliostats 102 is fixed in location by their respective support structures. In an operational aspect, light energy from the sun is reflected from the plurality of heliostats 102 and is directed toward a surface of the receiver 104.

The plurality of heliostats 102 is configured to be orientated to direct a beam of sunlight to the focal point of the solar power tower 116 by reflection of sunlight from a heliostat facet. The heliostat 102 is a device that reflects sunlight toward a predetermined target or the receiver 104. In a constructional aspect, the heliostat 102 includes a reflective surface (a heliostat sun face) that is configured to reflect the light energy falling on the reflective surface. For example, the reflective surface is a mirror. The reflective surface may have a flat configuration, or a slightly concave configuration adapted to focus the light energy (or heat) onto the receiver 104. The frame is formed, for example, from a lightweight metal such as aluminum.

The heliostat drive system 106 is in communication with the plurality of heliostats 102. The heliostat drive system 106 is configured to determine and control the orientation of the reflective surfaces of the plurality of heliostats 102. Since the sun moves relative to the heliostat, the heliostat drive system 106 is configured to change the orientation of the heliostat 102 with respect to the sun. In an aspect, the heliostat drive system 106 also includes a steering, and a positioning subsystem (not shown). The positioning subsystem includes a plurality of encoders to measure position of the heliostat 102. The positioning subsystem also includes high precision gearing and motors for providing azimuth and elevation movement to the heliostat 102 with respect to a reference position.

In operation, the heliostat field control system 114 is configured to determine a current position of the heliostat 102 and a number of parameters associated with the system 100. For example, the number of parameters include an amount of generated power, an inclination angle of the heliostat 102, an elevation angle of the heliostat 102, an azimuth angle of the heliostat 102, an altitude angle of the heliostat 102, a pitch angle of the heliostat 102, effect of environmental factors on the generated power and the like. Based upon the determination, the heliostat field control system 114 is configured to generate a control signal for changing the angles of the heliostat 102 using the heliostat drive system 106. The heliostat drive system 106 is configured to receive the control signal from the heliostat field control system 114 and provide a required orientation to the heliostat 102. In an aspect, the heliostat field control system 114 is configured to generate the control signal by tracking the current position of the sun. The control signal perform the required change in the position of the heliostat 102 using the heliostat drive system 106. In an aspect, the heliostat field control system 114 is a controller that receives a value of an electrical output of the photovoltaic or photochemical cell. The heliostat field control system 114 is configured to calibrate the orientation of the heliostat 102 based at least on the value of the received electrical output of the photovoltaic or photochemical cell.

In an aspect, the heliostat drive system 106 is configured to employ a plurality of feedback channels: a local feedback, a beam feedback, and a target feedback. The local feedback includes the current position and inclination of the heliostat 102. The beam feedback includes information regarding the beam formed by the reflected sunlight from the heliostat 102 including a beam intensity, and an angle of the beam's impact on the receiver 104. In an aspect, a beam measuring unit 112 is employed with the heliostat 102 to gather the information regarding the beam formed by the heliostat 102 on the receiver 104. The target feedback includes the current location of the receiver 104.

As shown in FIG. 1, the heliostat drive system 106 includes a power supply and converter 108 and a heliostat local control unit 110. In an example, the heliostat local control unit 110 is a closed-loop heliostat circuit. The closed-loop heliostat circuit determines the orientation of at least one of the plurality of heliostats 102.

The heliostat local control unit 110 is configured to receive the local feedback from the plurality of heliostats, the beam feedback, and the target feedback. The heliostat local control unit 110 is configured to generate a feedback signal based on the received feedbacks. The power supply and converter 108 is configured to receive a reference input (referring to a position at which the system 100 generates maximum or efficient power) and the feedback signal from the heliostat local control unit 110. Based on the received feedback signal and the reference input, the power supply and converter 108 is configured to alter the position of the heliostat 102 such that the difference between the reference input and the feedback signal can be reduced.

The system 100 is configured to control the plurality of heliostats by employing two levels of control, i.e., a first level and a second level. In the first level, the system 100 controls the communication between the plurality of heliostats 102 and the solar power tower 116. In the second level, the heliostat field control system 114 controls the heliostat local control unit 110. The heliostat local control unit 110 is configured to communicate between the heliostat and the solar power tower.

Overall, the system 100 is set up to control the heliostat's orientation in relation to the sun. The heliostat 102 is able to track the sunbeams intermittently or continuously and reflect the maximum heat towards the receiver, thereby increasing the efficiency of the solar power tower 116.

Figure 2:
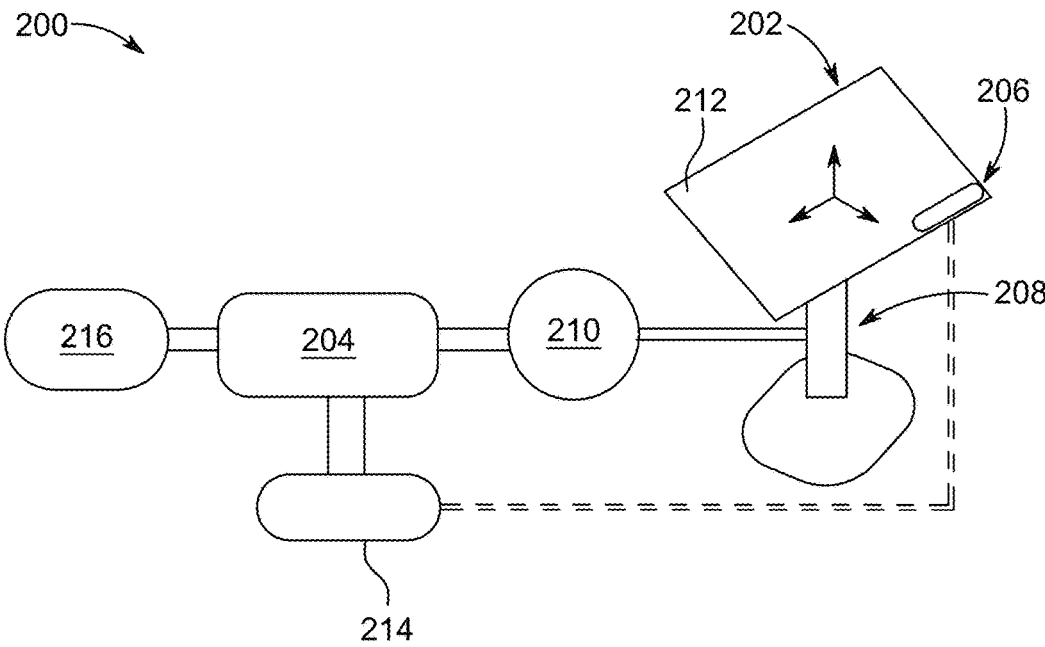
FIG. 2 illustrates a drive tracking system, according to aspects of the present disclosure.

FIG. 2 illustrates a drive tracking system 200 (heliostat drive tracking system 200) (hereinafter interchangeably referred to as "drive system 200"), according to aspects of the present disclosure. As shown in FIG. 2, the drive system 200 includes a heliostat structure 202, a power electronic converter 204, and a tracking controller 214. The drive system 200 is configured to move the heliostat structure 202 to follow the sunbeams intermittently or continuously, thereby maximizing the receiver's heat and increasing the overall efficiency of the solar power tower.

The heliostat structure (heliostat structure having dual-axis tracking) 202 includes a heliostat support frame 208, a plurality of linear actuators 210, and a heliostat facet 212. In one aspect, the heliostat structure 202 is configured to orient in three-dimensional (3D) motion by employing the dual-axis tracking. The dual-axis tracking allows the heliostat structure 202 to assess and concentrate the maximum allowable power from the sun.

The heliostat support frame 208 includes a foundation base and a vertical support. In an example, the vertical support is a tubular structure. The foundation base is configured to secure the heliostat support frame 208 with a fixed base such as a cemented in ground. The foundation base can be secured to the cemented ground by means of fasteners such as bolts, pins, screws or any such means. In an aspect, the vertical support may be directly positioned in the ground and secured tightly using a packing soil around its outer surface, or by other means such as concrete, or a stone foundation. In a structural aspect, the heliostat support frame 208 includes a rotation joint, a rod, and a foundation base. The rotation joint is connected across the underside of the heliostat facet. The rod has a top connection point and a bottom connection point. The top connection point is fixed to the rotation joint. The bottom connection point is fixed to the foundation base. The rod is attached on an axis perpendicular to the foundation base.

The plurality of linear actuators 210 is configured to provide an azimuth tracking and an elevation tracking to the heliostat facet 212, the heliostat facet providing the relative fixed point for both the azimuth tracking and the elevation tracking. In the azimuth tracking, an angle is measured clockwise around the heliostat's horizon, the heliostat being the vertex of the angle measurement, and a celestial body (sun, moon). In the elevation tracking, a vertical angle between the celestial body (sun, moon) and the heliostat's local horizon is measured, the heliostat being the vertex of the vertical angle measurement. In an aspect, the plurality of linear actuators 210 is configured to provide an azimuth drive and an elevation drive to the heliostat facet 212. In the azimuth drive, the heliostat facet 212 moves in a horizontal plane, along the direction of the sun. In the elevation drive, the heliostat moves in a vertical plane, according to the position of the sun in the sky relative to the heliostat's horizon. A first end of each of the plurality of linear actuators 210 is connected to an underside of the heliostat facet 212 and a second end of each of the plurality of linear actuators 210 is connected to the heliostat support frame 208. For example, the plurality of linear actuators 210 includes at least two linear actuators. In a connecting aspect, a first end of a first linear actuator is attached to the base of the underside of the heliostat facet in line with the central axis of the heliostat support frame 208. A second end of the first linear actuator is attached to the heliostat support frame 208. A first end of a second linear actuator is attached to the underside of the heliostat facet offset to the central axis of the heliostat support frame and a second end of the second linear actuator is attached to the heliostat support frame 208. The plurality of linear actuators 210 possesses two rotation points, that is, the first linear actuator controlling an elevation rotation of the heliostat facet 212, and the second linear actuator controlling an azimuth rotation of the heliostat facet 212. In an aspect, the plurality of linear actuators is powered by a plurality of induction motors.

In an example, the plurality of linear actuators 210 (azimuth and elevation linear actuators) of 8-24, 10-20 or 12-16-inches and 2-12, 4-10- or 6-8-inches lengths are used to achieve the 3D rotational motion. The size of the plurality of linear actuators 210 can be altered according to the facet dimensions to achieve the maximum desired angle throughout the year.

The heliostat facet 212 is configured to hold/receive a reflecting mirror. The heliostat facet 212 reflects and concentrates the sun's energy (for example, heat and light) towards the receiver. In an example, the heliostat facet is a planar surface.

The power electronic converter 204 includes a plurality of direct current (DC) chopper converters. The plurality of DC chopper converters are mechanically coupled to the plurality of linear actuators 210 via a worm gear system. The plurality of permanent magnetic motors is mechanically coupled to the plurality of linear actuators 210. Each permanent magnetic motor is supplied from a variable voltage source to control the speed of the permanent magnetic motor, resulting in controlling the drive system 200. For example, the DC chopper converters are a H-bridge converter or a four-quadrant DC chopper. The DC chopper converter is configured to operate the DC motor in forward and reverse motoring as well as in forward and reverse braking modes. In an aspect, the plurality of DC choppers converters is based on silicon carbide discreet switches. The worm gear system includes a plurality of worm gears and a plurality of linear screws.

The tracking controller 214 includes a three-axis gyroscopic sensor and a microcontroller. The three-axis gyroscopic sensor (position angles sensor) is mounted on a rear surface of the heliostat facet. The three-axis gyroscopic sensor is connected to the microcontroller using a wired connection. The microcontroller is configured with instructions to control the DC choppers based on data provided by the three-axis gyroscopic sensor. In an aspect, the three-axis gyroscopic sensor operates in a power range of 3 volts to 5 volts.

The three-axis gyroscopic sensor is configured to be employed as a local feedback controller and is also known as the Motion Processing Unit (MPU) sensor. The three-axis gyroscopic sensor calculates the three-dimension angles associated with the heliostat structure 202. In an example, the three-axis gyroscopic sensor is an MPU-6050 sensor that captures the three-dimension in the X, Y, and Z axes to assess the rotation angles (elevation angles and azimuth angles) and the reference angles. In an example, the three-axis gyroscopic sensor is a micro-electromechanical system with a three-axis accelerometer sensor. The three-axis accelerometer sensor is configured to measure 3D angles associated with the heliostat. The measurements provided by the MPU-6050 sensor are raw accelerometer values that are further processed to determine Pitch ($\beta$), Roll ($\aleph$), and Yaw ($\epsilon$) angles. However, the essential angles for the heliostat closed feedback application are $\beta$ and $\aleph$ angles, which may be expressed as $$\beta = \cos^{-1}\left(\frac{A_y}{\sqrt{A_x^2 + A_y^2 + A_z^2}}\right), \aleph = \cos^{-1}\left(\frac{A_x}{\sqrt{A_x^2 + A_y^2 + A_z^2}}\right) \quad (1)$$

where, $A_x$, $A_y$, and $A_z$ are the three-axis accelerometer sensor readings. The MPU-6050 sensor is inexpensive, easy to integrate, and small operation voltage range (3-5 V), therefore providing a cost effective and simple drive system 200. In an aspect, the three-axis gyroscopic sensor includes a digital motion processor, which provides efficient performance with high computational power. In an example, the three-axis gyroscopic sensor operates under temperatures between −40° C. and +85° C. with a sensing tolerance is ±3%.

In an operative aspect, the plurality of linear actuators 210 is controlled by the plurality of DC chopper converters. The plurality of DC chopper converters is configured to provide a varying voltage to the plurality of permanent magnetic motors. By varying the dc voltage, the rotational speed of the plurality of permanent magnetic motors can be adjusted. The rotational speed of the plurality of permanent magnetic motors alters the speed of extension of the plurality of linear actuators 210. The tracking controller 214 is configured to determine the varying DC voltage to be fed to the plurality of permanent magnetic motors.

Overall, the drive system 200 is set up to provide closed-loop heliostat control. The drive system 200 determines the orientation of the heliostat facet 212 with the three-axis gyroscope. The three-axis gyroscope transfers the orientation of the heliostat facet 212 to the microcontroller. In an aspect, the microcontroller receives a first signal and a second signal. In an example, the first signal is a feedback signal produced by the three-axis gyroscope, and the second signal comprises a location data point and a time data point produced by a global positioning system (GPS) sensor 206.

By analyzing the first signal and the second signal, the microcontroller outputs a pulse-width modulation signal to the plurality of DC chopper converters. The plurality of DC chopper converters alters the speed of a plurality of linear actuators connected in response to the pulse-width modulation signal, thereby changing the elevation and the azimuth of the heliostat facet 212. In an aspect, the orientation of the heliostat structure 202 is changed according to a time-step. The pulse-modulation signal includes two states, a first state extending the plurality of linear actuators and a second state retracting the plurality of linear actuators.

The microcontroller is further configured to determine the orientation (optimal orientation of the heliostat facet) at which maximum sunbeam reflection onto the solar power tower is achieved.

Figure 3:
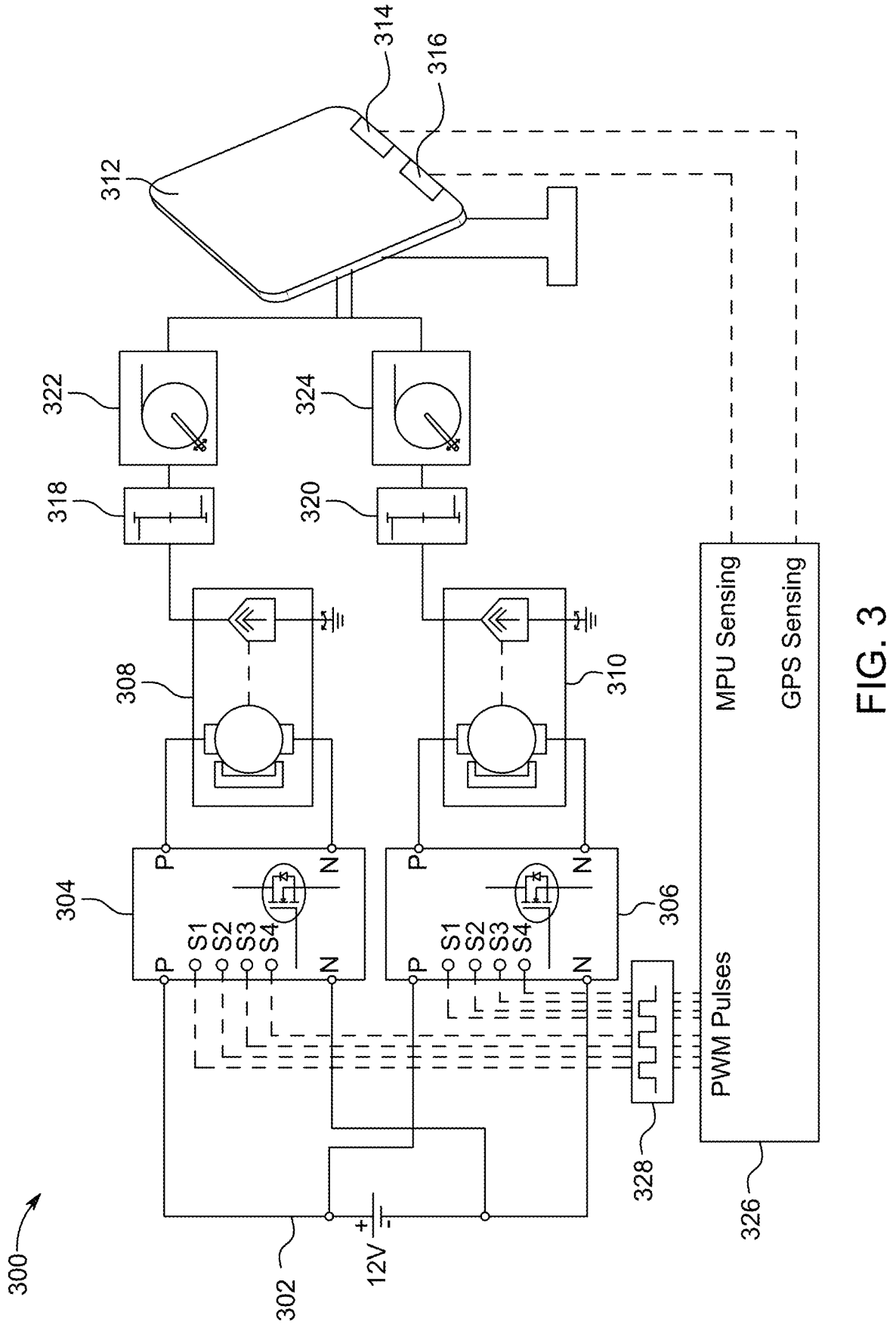
FIG. 3 illustrates an experimental test setup, according to aspects of the present disclosure.

FIG. 3 illustrates an experimental test setup 300, according to aspects of the present disclosure. As shown in FIG. 3, the experimental test setup 300 includes two class-E DC-chopper converters 304, 306, two permanent magnet DC (PMDC) motors 308, 310, two worm gears 318, 320, two linear actuators 322, 324, and the heliostat facet 312. Each of the two Class-E DC-chopper converters 304, 306 is connected to corresponding the two PMDC motors 308, 310. Each PMDC motor 308, 310 is mechanically coupled to corresponding linear actuators 322, 324 through the worm gears 318, 320. Using the linear actuators 322, 324 and the worm gears 318,320, the PMDC motors 308, 310 are configured to move the heliostat facet 312 in the three dimensions. The DC-chopper converters 304, 306 are supplied from a voltage supply 302. In an example, the voltage supply 302 is a 15-V DC supply. The heliostat facet 312 includes the GPS sensor 314, and a motion processing unit (MPU-6050) sensor 316. The GPS sensor 314 provides a date and location data, longitude, and latitude of the heliostat location. The MPU-6050 sensor 316 is mounted on the rear surface of the heliostat facet 312 to give the azimuth and elevation mirror angles to a microcontroller 326. For example, the microcontroller 326 is an Arduino-Mega microcontroller. In an example, the GPS sensor 314 is fixed to a rear surface of the heliostat facet 312. The GPS sensor 314 is connected to the microcontroller 326. The microcontroller 326 is configured to receive the data including date and location data, longitude, and latitude of the heliostat location from the GPS sensor 314 and the azimuth and elevation mirror angles from the MPU-6050 sensor 316, respectively. Based on the received inputs, the microcontroller 326 is configured to generate a series of gating pulses (328) for controlling the functioning of the two class-E DC-chopper converters 304, 306 simultaneously. The gating pulses 328 are connected to the class-E DC-chopper converters 304, 306 using a plurality of twisted cables to avoid the wiring electro-magnetic interference effects.

Figure 4:
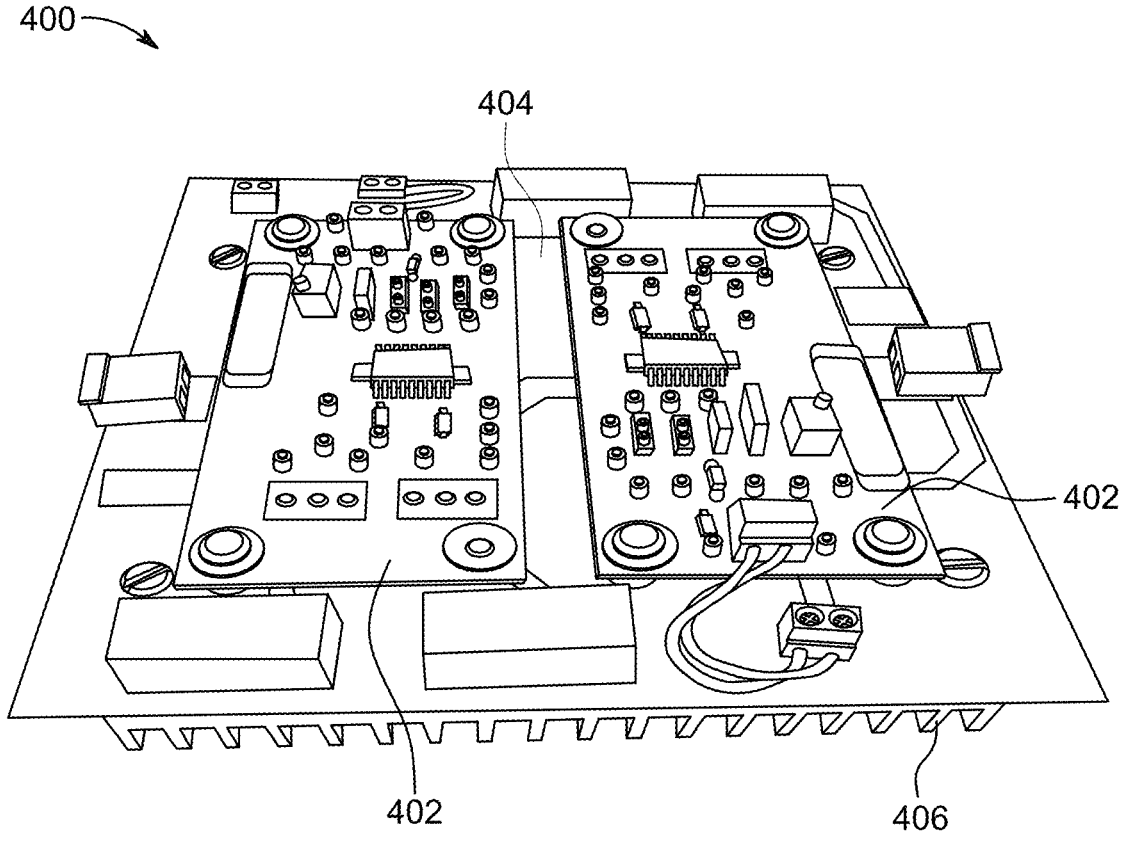
FIG. 4 illustrates a silicon carbide-based class-E DC chopper, according to aspects of the present disclosure.

FIG. 4 illustrates a silicon carbide-based class-E DC chopper 400, according to aspects of the present disclosure. The class-E DC chopper 400 is a device that converts direct current from one state to another either analog current or from a fixed constant state to a variable form. The class-E DC chopper 400 is a universal chopper and can operate in all four quadrants. In the present disclosure, the class-E DC chopper 400 is designed and fabricated in King Fahd University of Petroleum and Minerals (KFUPM) laboratories. As shown in FIG. 4, the Class-E DC chopper 400 includes a class-E DC chopper PCB 404 (acting as a base plate), two Silicon Carbide (SiC) based driver PCB 402 setting on the base plate 404, and a heat sink 406.

The heat sink 406 is configured to provide a path to dissipate the heat generated by the plurality of electronic components located on the base plate 404. In an example, the class-E DC chopper PCB 404 is a UCC21521CEVM-286 fabricated by CREE company located at 4600 Silicon Dr, Durham, NC 27703, United States. UCC21521CEVM-286 is an isolated dual-channel gate driver with 4-A source and 6-A sink peak current. In an aspect, during the fabrication of the class-E DC chopper 400, a plurality of discrete SiC MOSFET switches are used to decrease the overall converter losses.

Figure 5:
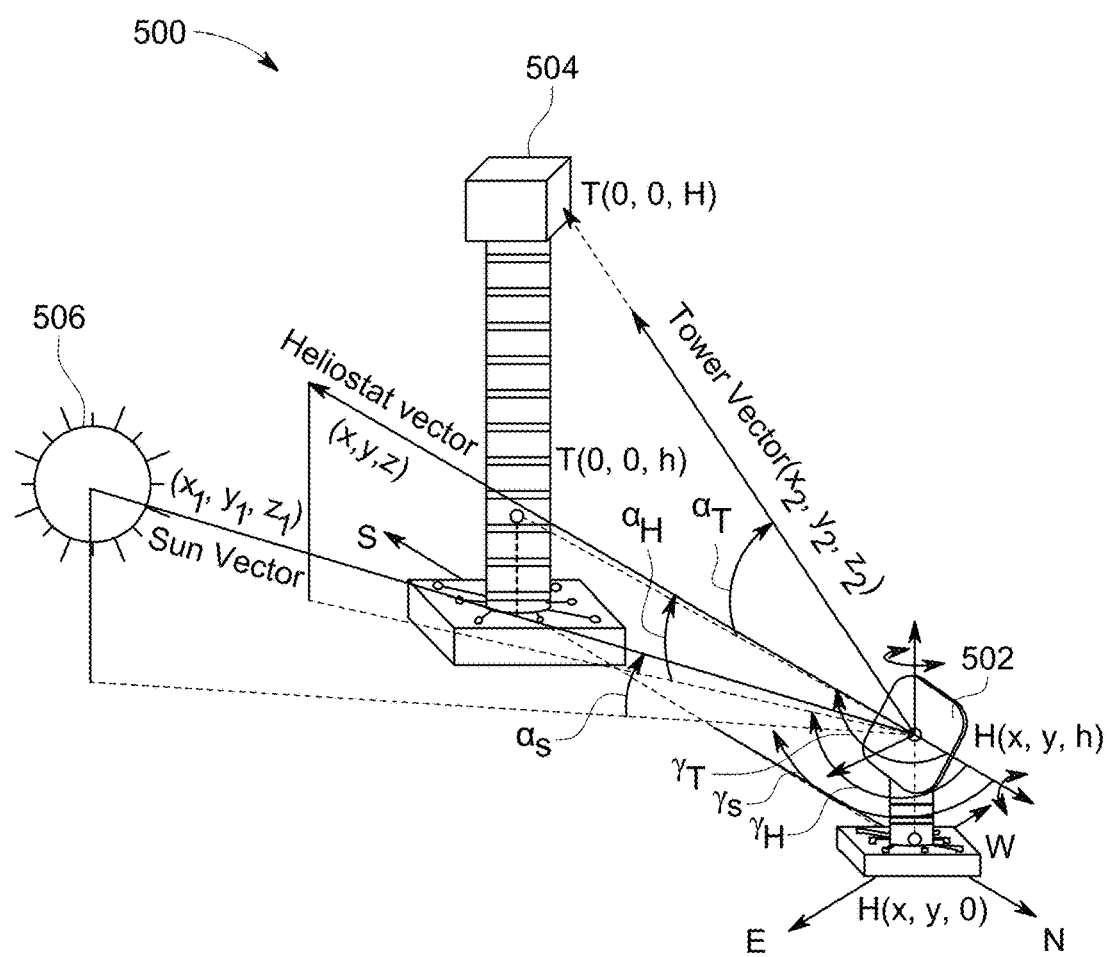
FIG. 5 illustrates a coordinate system showing sun, target, and angles of the heliostat, according to aspects of the present disclosure.

FIG. 5 illustrates a coordinate system 500 showing position of the sun 506, the tower 504, and angles of the heliostat 502, according to aspects of the present disclosure. In an aspect, the angles of the heliostat 502 are an elevation vector, a heliostat vector, the elevation angle and the azimuth angle. To track the sunbeam, three sets of angles must be defined, i.e., an angle between the sun 506 and the tower 504, an angle between the sun 506 and the heliostat 502, and an angle between the tower 504 and the heliostat 502. As shown in FIG. 5, to determine the three sets of angles, three vectors named: a sun vector, a target vector and the heliostat vector are calculated.

In the present disclosure, following mathematical models are employed for identifying these three sets of angles:

Solar angles model: Sun position is defined by two principal angles, a solar elevation angle ($\alpha_s$), and a solar azimuth angle ($\gamma_s$). The sun vector is defined by a declination angle ($\delta$) and a time angle ($\omega$).

$$\delta = 23.45\sin\left(360\left(\frac{284+n}{365}\right)\right), \qquad (2)$$

where $\delta$ is the declination angle, and n is the day number, for example n=1 on January 1.

Depending on time and date values (year, month, day, hour, minutes, and seconds) and location (longitude ($\varphi$) and latitude angles), the elevation and azimuth angles of the sun are calculated as described in FIG. 5. The sun vector is calculated by:

$$\theta_z = \cos^{-1}[\cos(\varphi)\cos(\delta)\cos(\omega) + \sin(\varphi)\sin(\delta)] \qquad (3)$$
$$\alpha_s = 90 - \theta_z$$
$$\gamma_s = \text{sign}(\omega)\left|\cos^{-1}\left(\frac{\cos(\theta_z)\sin(\varphi) - \sin(\delta)}{\sin(\theta_z)\cos(\varphi)}\right)\right| \quad ;$$

Tower and heliostat angles model: The elevation angle of the tower (receiver) for each heliostat ($\alpha_T$), is defined by the tower height (H), the height of each heliostat (h), and the distance of the heliostat 502 from the tower base (R), as illustrated in FIG. 5. The target position of the solar power tower 504 is defined by the target azimuth angle ($\gamma_T$), which is a relationship with the North direction at the heliostat and the solar power tower. The target azimuth angle ($\gamma_T$) and the target elevation angle ($\alpha_T$) (two heliostat angles) are called heliostat mirror angles. FIG. 5 shows both heliostat mirror angles. The model converts the sun and tower angles to points and then finds the average mirror vector based on the three-dimensional Cartesian form (x, y, and z). The following equations describe the Cartesian coordinates for unit vectors as shown in FIG. 5, followed by the equivalent functionals to calculate heliostat reference angles:

Convert the two sun angles to the sun vector characterized by $x_1$, $y_1$, and $z_1$ values $$
\begin{aligned}
z_1 &= \sin(\alpha_s) \\
x_1 &= \cos(\alpha_s)\cos(-\gamma_s)\,; \\
y_1 &= \cos(\alpha_s)\sin(-\gamma_s)
\end{aligned} \tag{4}
$$

Convert the two target angles to the target vector characterized by $x_2$, $y_2$, and $z_2$ values:

$$
\begin{aligned}
z_2 &= \sin(\alpha_T) \\
x_2 &= \cos(\alpha_T)\cos(-\gamma_T)\,; \\
y_2 &= \cos(\alpha_T)\sin(-\gamma_T)
\end{aligned} \tag{5}
$$

Combining the equations (4) and (5), the heliostat vector characterized by X, Y, and Z are calculated as:

$$
\begin{aligned}
X &= (x_1 - x_2)/2 + x_2 \\
Y &= (y_1 - y_2)/2 + y_2\,; \\
Z &= (z_1 - z_2)/2 + z_2
\end{aligned} \tag{6}
$$

Then, the reference angles can be calculated as follows.

$$
\alpha_H^* = \sin^{-1}\!\left(Z/\left(X^2 + Y^2 + Z^2\right)^{1/2}\right) \tag{7}
$$

$$
\gamma_H^* = \begin{vmatrix}
\tan^{-1}\left(\dfrac{-Y}{X}\right) & \text{if } X > 0 \\
\tan^{-1}\left(\dfrac{-Y}{X}\right) + 90\ deg & \text{if } X < 0,\ \text{and } Y < 0 \\
\tan^{-1}\left(\dfrac{-Y}{X}\right) - 90\ deg & \text{if } X < 0,\ \text{and } Y > 0 \\
90\ deg & \text{if } X = 0,\ \text{and } Y > 0 \\
-90\ deg & \text{if } X = 0,\ \text{and } Y < 0 \\
\text{undefined} & \text{if } X = 0,\ \text{and } Y = 0
\end{vmatrix}\,;
$$

Figure 6:
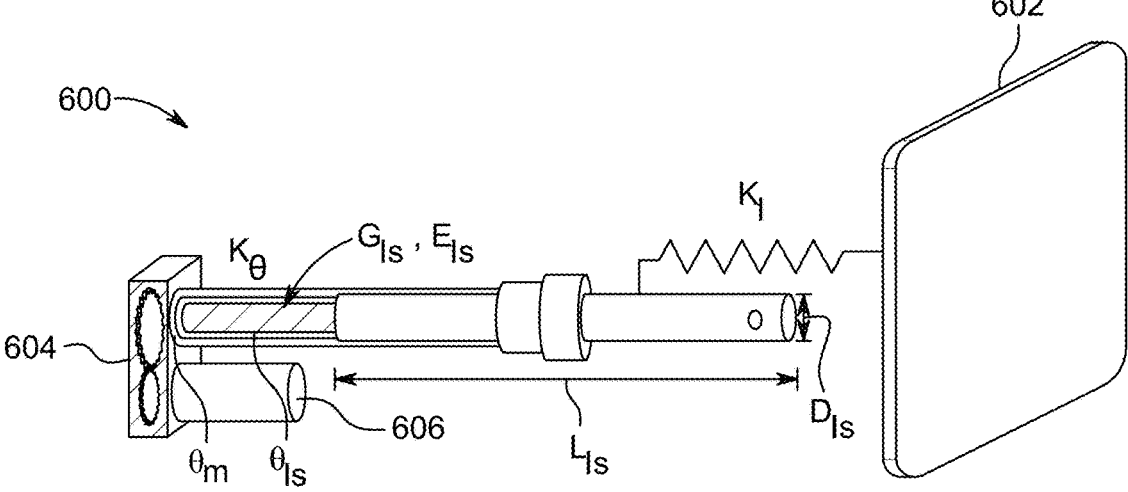
FIG. 6 illustrates a free-body diagram of the drive tracking system, according to aspects of the present disclosure.

FIG. 6 illustrates a free-body diagram 600 of the drive tracking system 200, according to aspects of the present disclosure. In an aspect, the drive tracking system 200 employs a heliostat drive model. To identify the performance of the permanent magnetic motors, the load torque-speed characteristics are essential. The heliostat drive model is developed from a torque-angle mathematical relation. The torque-angle mathematical relation involves dynamic parameters such as masses, heliostat geometry, lead-screw parameters, and linear screw dimensions.

The free-body diagram 600 represents a diagrammatic representation of the drive tracking system 200 that is isolated from its surroundings. The free-body diagram 600 shows all the forces acting on the drive tracking system 200. In the drive tracking system 200, the heliostat facet 212 is characterized by a time-delay intention besides stiffness. The load torque of the permanent magnetic motors causes a change in the two-directional angles (azimuth and elevation) of the heliostat. Also, the load torque of the permanent magnetic motors leads to a linear actuator orientation throughout the heliostat movements. In the free-body diagram 600, inertia, friction, and stiffness parameters are considered, that are significantly influencing design of an integrated heliostat linear drive system. The heliostat linear drive actuator's mathematical model is constructed by integrating the motion equations between the permanent magnetic motor 606 and the power screw 604 (gear box). The free-body diagram 600 represent the driving mechanism with the heliostat linear drive system 200. The free-body diagram 600 includes components such as the permanent magnetic motor 606, the power screw 604 (gear box), and the heliostat facet 602. As shown in FIG. 6, $D_{ls}$ is lead-screw diameter (m), $E_{ts}$ is lead-screw shear modulus (Pa), $G_{ls}$ is lead-screw elastic moduli (Pa), $K_t$ is longitudinal stiffness (Pa·m), $l_{ls}$ is lead-screw length (m), $K_\theta$ is equivalent torsional stiffness (Pa·m³), $\theta_m$ is motor angle (rad) and $\theta_{ls}$ is lead-screw angle (rad).

Figure 7:
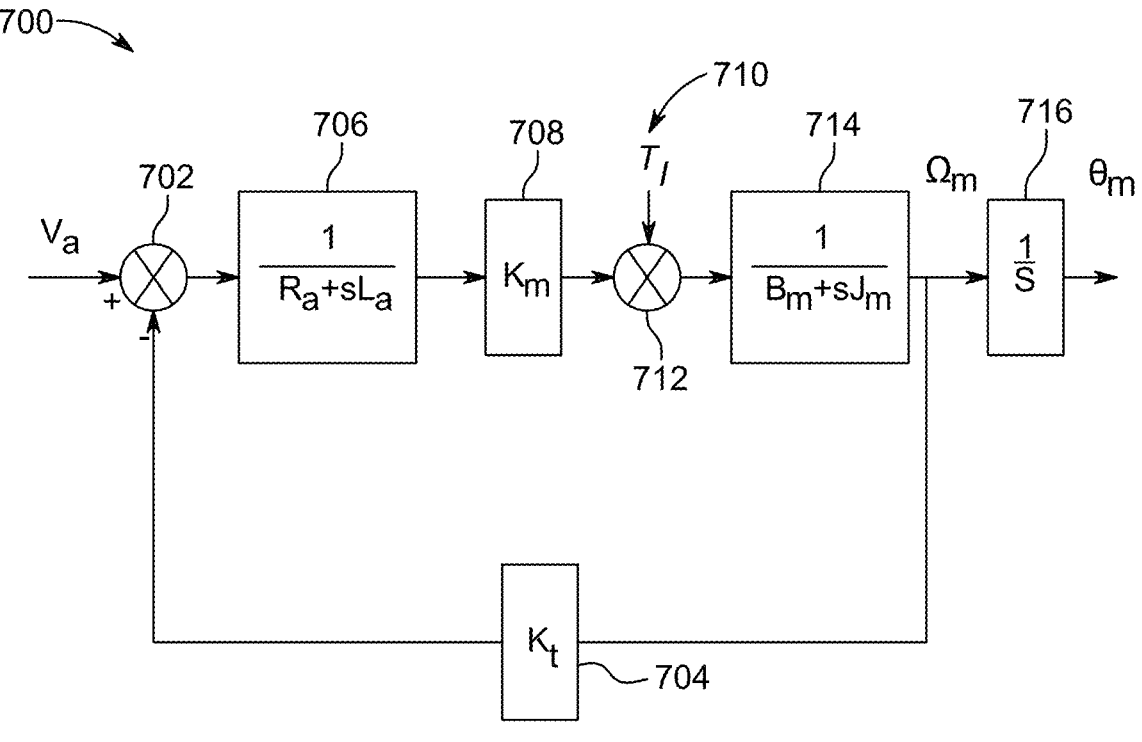
FIG. 7 depicts a block diagram of the Permanent Magnet DC (PMDC) motor model, according to aspects of the present disclosure.

FIG. 7 depicts a block diagram of the permanent magnet DC (PMDC) motor model 700, according to aspects of the present disclosure. The PMDC motor model 700 includes two systems i.e., an electrical system and a mechanical system. The electrical system and the mechanical system are coupled by a back emf constant and a torque constant. In an aspect, the back emf constant and the torque constant are assumed to be equal to is the motor constant ($K_f$). The PMDC motor model 700 includes two first order systems, and one second order system. A first order system includes an input 702, a block 706, and a block 708. Block 710 represents a multiplying function 712. Another first order system includes a block 714, and a block 716. The second order system includes a block 704. In block 706, $R_a$ represents an armature resistance ($\Omega$) and $L_a$ represents a motor inductance (H). In block 708, $K_m$ represents motor constant (V/rad/s). In block 714, $J_m$ represents motor inertia (kg·m²) and $B_m$ represents damping coefficient of the motor shaft (Nm/(rad·s)).

Starting from the electrical motor modeling, the PMDC motor has two relations, i.e., electrical and dynamic equations that can be described by differential equations as follows:

$$
\begin{aligned}
V_a - E_a &= R_a i_a + L_a \frac{di_a}{dt}, \text{ where } E_a = K\omega_m \\
T_m - T_L &= B_m \omega_m + J_m \frac{d\omega_m}{dt}, \text{ where } T_m = K i_a
\end{aligned}\,; \tag{8}
$$

where $E_a$ is the induced electromotive force (EMF), and $T_e$ is the electromagnetic torque. $J_m$ is the rotor moment of inertia, $B_m$ is the viscous friction coefficient, and K is the motor-flux constant. $R_a$ and $L_a$ are the motor armature resistance and leakage inductance. Therefore, equation (8) can be arranged as follows:

$$
\begin{aligned}
L_a \frac{di_a}{dt} &= V_a - K\omega_m - R_a i_a \\
J_m \frac{d\omega_m}{dt} &= K i_a - T_L - B_m \omega_m
\end{aligned}\,; \tag{9}
$$

Applying Laplace transform to equation (9), the electro-mechanical model can be written as follows:

$$
\begin{aligned}
L_a s I_a(s) &= V_a(s) - K\Omega_m(s) - R_a I_a(s) \\
J_m s \Omega_m(s) &= K I_a(s) - T_L(s) - B_m \Omega_m(s)
\end{aligned} \tag{10}
$$

Finally, the motor transfer function can be written as follows:

$$
\frac{\Omega_m(s)}{V_a(s)} = \frac{K}{R_a(1+\tau_a s)B(1+\tau_m s) + K^2}, \tag{11}
$$

where $\tau_a = L_a/R_a$ and $\tau_m = J_m/B_m$ represent the motor electrical and mechanical time constants, respectively. The motor armature inductance ($L_a$), resistance ($R_a$), back emf constant ($K$), inertia ($J_m$), and friction coefficient ($B_m$) are obtained from experimental measurements.

Figure 8:
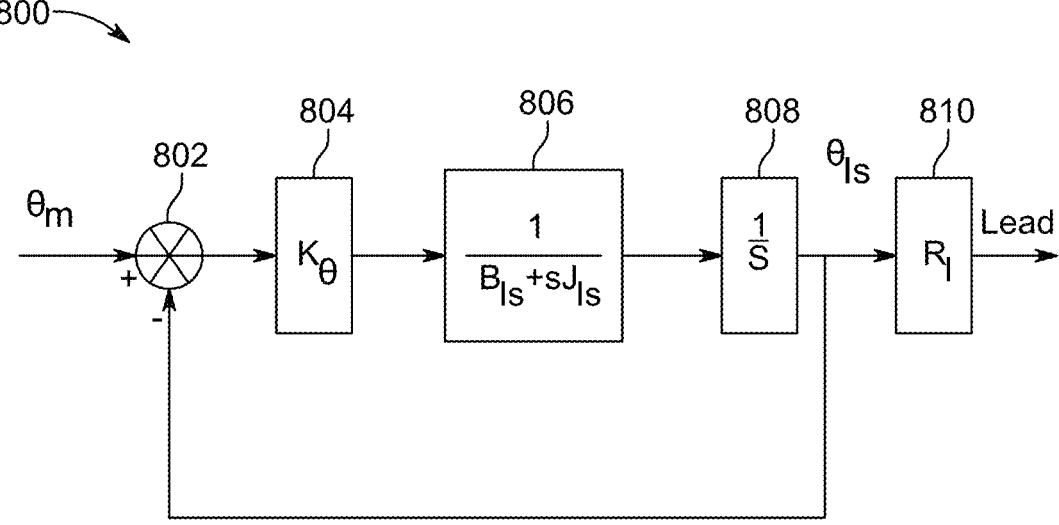
FIG. 8 depicts a block diagram of a lead-screw model, according to aspects of the present disclosure.

FIG. 8 depicts a block diagram of a lead-screw model 800, according to aspects of the present disclosure. The heliostat's dynamic model, the linear screw model, and the heliostat facet model can be described by equation (12). The lead-screw model 800 includes an input block 802, a block 804, a block 806, a block 808, and a block 810. In block 804, $K_\theta$ represents an equivalent torsional stiffness (Pa·m³). In block 806, $B_{ls}$ represents the friction coefficient of the lead screw and $J_{ls}$ represents lead-screw equivalent inertia (kg·m²). In block 810, $R_l$ represents an equivalent lead-screw resistance.

A driving torque of the motor $T_m$ is transformed into a rotational motion of the lead screw $\theta_{ls}$ and an elastic deformation ($\theta_{ls}$-$\theta_m$) due to the equivalent torsional stiffness $K_\theta$ existing between a motor and a lead screw. Besides, the longitudinal stiffness existing between the lead-screw heliostat facet is expressed as $K_l$, indicating the longitudinal stiffness existing between the ball nut and the heliostat facet and is closely related to the value of the elastic modulus of the lead screw ($E_{ls}$)

$$
\begin{aligned}
T_m &= J_m \frac{d\omega_m}{dt} + B_m \omega_m + T_{ls} \\
T_{ls} &= K_\theta(\theta_{ls} - \theta_m) \\
\theta_{ls} &= \frac{T_{ls}}{J_{ls}s + B_{ls}} \\
K_\theta &= \left[\frac{\pi G_{ls} D_{ls}^4}{32 l_{ls}}\right] \\
K_l &= \left[\frac{\pi E_{ls} D_{ls}^2}{4 l_{ls}}\right]
\end{aligned} \tag{12}
$$

Conversion from rotational to linear movement can be expressed as $$
\text{Lead} = R_l/\theta_{ls}; \tag{13}
$$

$D_{ls}$, $L_{ls}$, $G_{ls}$, $J_{ls}$, and $B_{ls}$ are defined as the diameter, length, shear modulus, equivalent inertia, and friction coefficient of the lead screw. The equivalent torsional stiffness of the linear screw, described by equation (12), has five main parameters related to converting the rotational motion of the lead screw to a linear movement of the lead screw. By applying the Laplace transform of equations (12) and (13), the block diagram model of the lead screw presented in FIG. 8 can be acquired.

Figure 9A:
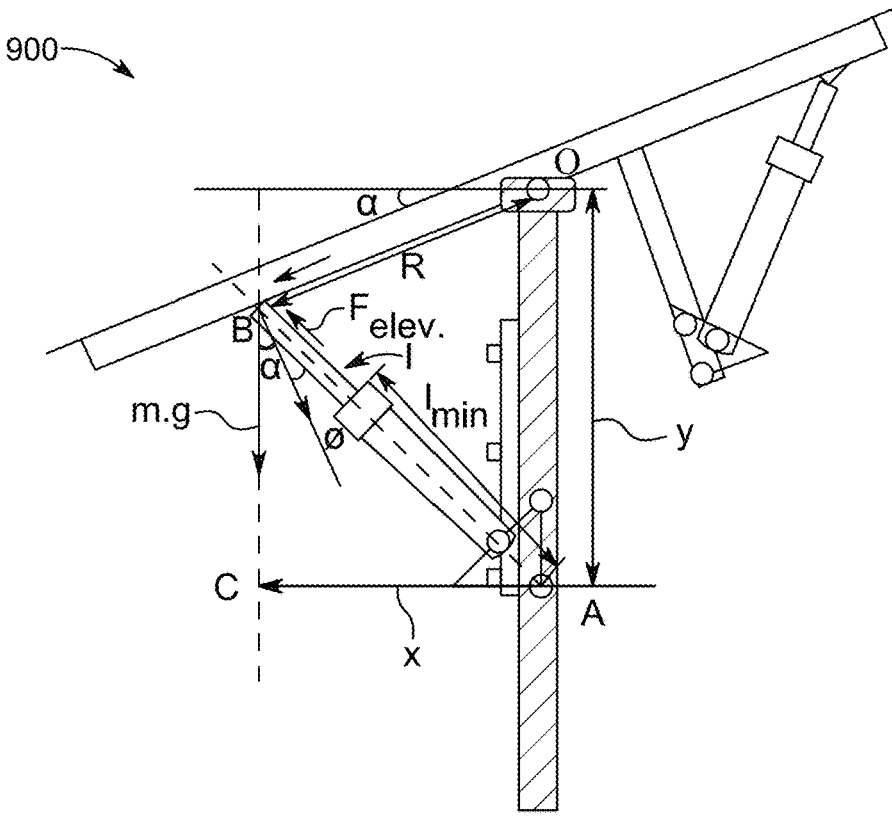
FIG. 9A represents a cross-sectional view of a heliostat facet model having an elevation drive, according to aspects of the present disclosure.

FIG. 9A represents a cross-sectional view of the heliostat facet model 900 having an elevation drive. PMDC Motors must accelerate the heliostat facet (acting as load) by overcoming system friction and gravity without overheating the system's vibrations. Therefore, there are outlines for picking a motor size and suitable actuator stroke length. FIG. 9A shows the detailed design of the linear actuator for the elevation drive of the heliostat. For the elevation drive, the heliostat's geometric dimensions α', α, Ø, R, x, y, $l_{ls}$, and $l_{min}$ are defined as follows: a' is the sloping elevation angle and α is its complementary angle. Ø is the angle between the facet norm and the actuator orientation. r is the distance between the heliostat origin O and the actuator fixing point B. The coordinates x and y are horizontal and vertical dimensions between points A to C, and A to O, respectively. $l_{ls}$ is the lead-screw length, and $l_{min}$ is the original actuator length.

For elevation movement, the actuator force $F_{elev.}$ is given by $$
\begin{aligned}
F_{elev.} &= mg\cos(\alpha' + \phi) \\
\cos(\alpha' + \phi) &= BC/AB \\
BC &= y - R\sin(\alpha') \quad ; \\
\alpha' &= 90 - \alpha \\
AB &= l_{ls} + l_{min}
\end{aligned} \tag{14}
$$

Figure 9B:
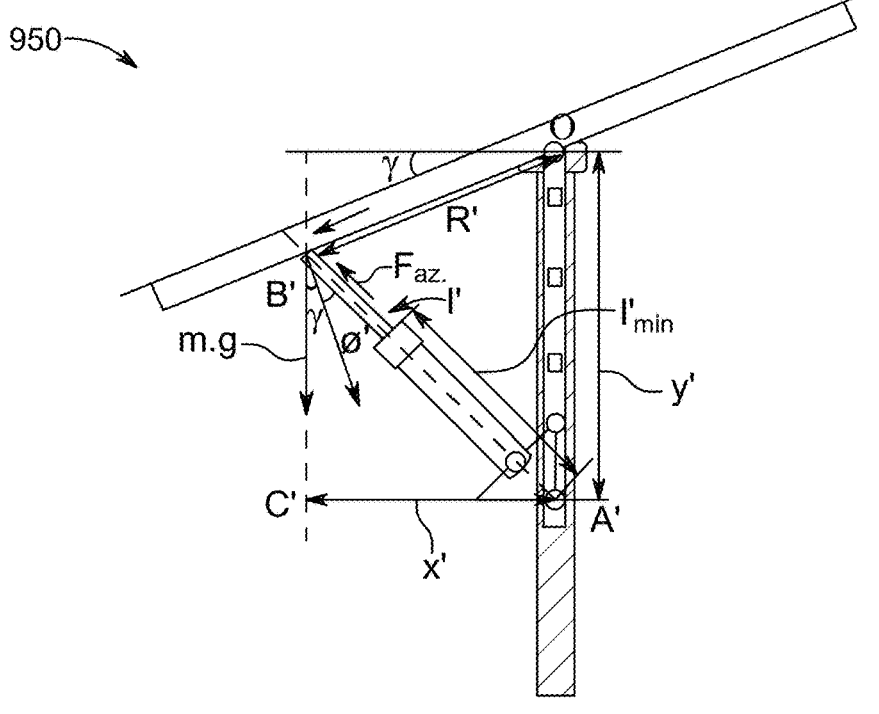
FIG. 9B represents a cross-sectional view of the heliostat facet model having an azimuth drive, according to aspects of the present disclosure.

FIG. 9B represents a cross-sectional view of the heliostat facet model 950 having an azimuth drive, according to aspects of the present disclosure. For the heliostat facet model 950 as shown in FIG. 9B, the geometric dimensions parameters γ', Ø', R', x', y', l', and l' min are defined as follows: γ is the sloping azimuth heliostat angle and γ is its supplementary angle. Ø' is the angle between the facet norm and the actuator orientation. r' is the distance between the heliostat origin O and the actuator fixing point B'. The coordinates x' and y' are the horizontal and vertical dimensions between points A' to C' and A' to O, respectively. $l'_{ls}$ is the azimuth lead-screw length, and $l'_{min}$ is the original actuator length. For azimuthal movement, the actuator force $F_{az}$ is given by:

$$
\begin{aligned}
F_{az.} &= mg\cos(\gamma' + \phi') \\
\cos(\gamma' + \phi') &= B'C''/A'B' \\
B'C'' &= y' - R'\sin(\gamma') \quad ; \\
\gamma' &= 180 - \gamma \\
A'B' &= l'_{ls} + l'_{min}
\end{aligned} \tag{15}
$$

The motor shaft torque needed to accelerate the load inertia is calculated as:

$$
T_l = \frac{2\pi a}{P} J_t + \frac{FP}{2\pi \eta_s}; \tag{16}
$$

where, P is the screw pitch, $\eta_s$ is lead-screw efficiency, a is the linear acceleration, and $J_t$ is the total reflected inertia including the load to the lead-screw shaft given as:

$$
J_t = J_{ls} + J_l, \tag{17}
$$

where $J_{ls}$ is the lead-screw inertia and $J_t$ is the reflected load inertia, kg-m².

Figure 10:
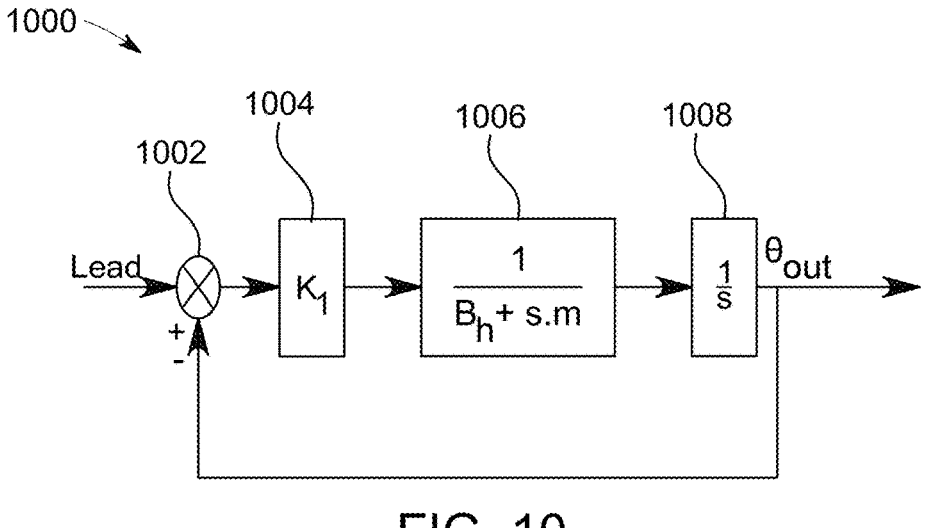
FIG. 10 depicts a block diagram of the heliostat facet model, according to aspects of the present disclosure.

FIG. 10 depicts a block diagram of the heliostat facet model 1000, according to aspects of the present disclosure. The heliostat facet and mirror mass are expressed totally in m, and the longitudinal damping coefficient ($B_h$) is minimal and can be neglected. The heliostat facet model 1000 includes an input block 1002, a block 1004, a block 1006, and a block 1008. In block 1004, $K_l$ represents longitudinal stiffness (Pa·m). In block 1006, $B_h$ represents the friction coefficient of the heliostat facet and m represents heliostat facet weight (kg).

Figure 11:
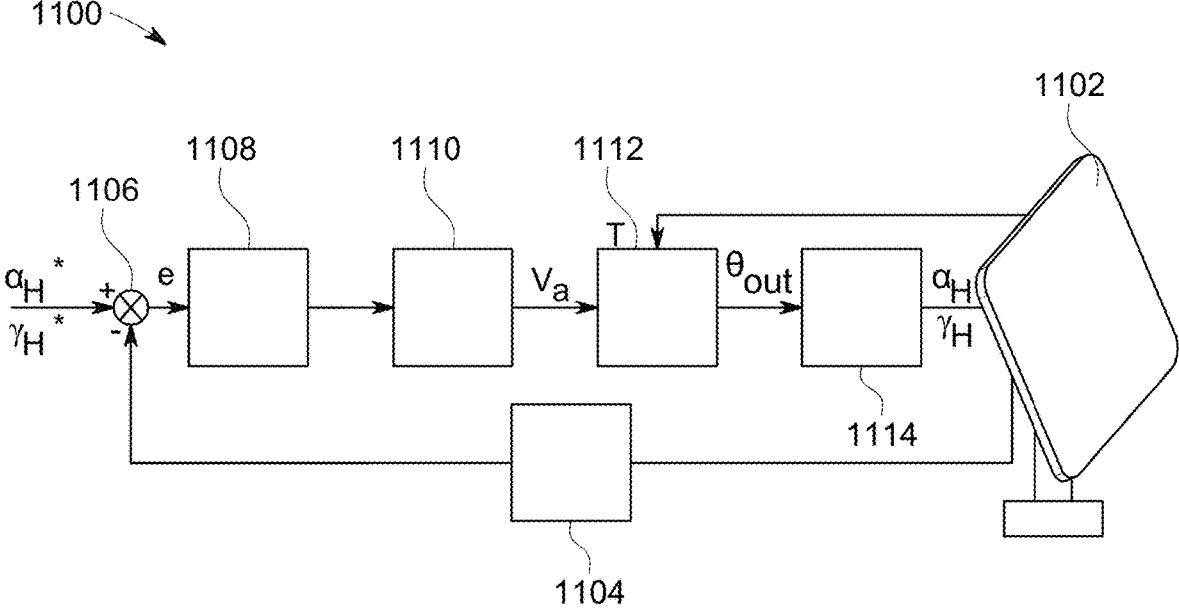
FIG. 11 depicts a block diagram of a heliostat integrated system with a closed-loop local control scheme, according to aspects of the present disclosure.

FIG. 11 depicts a block diagram of a heliostat integrated system 1100 with a closed-loop local control scheme, according to aspects of the present disclosure. For controlling the movements of the solar power tower (SPT), two levels of controlling, i.e., a primary control and a slave control is performed by the drive system 200. The primary control is responsible for the communication between the heliostats 1102 and operating the different SPT equipment. The slave control is responsible for heliostat tracking. FIG. 11 represents the closed-loop heliostat local control scheme. The desired heliostat angles are calculated based on the location and time generated by the GPS sensor. The MPU position (angles sensor) sends a feedback signal to the microcontroller. Based upon the feedback signal, the micro-controller regulates the duty cycle to the DC/DC converter (power electronic converter 204) and controls the permanent magnetic motors to achieve tracking of the heliostat 1102.

The heliostat integrated system 1100 includes the heliostat 1102, a feedback position sensor 1104, an input 1106, a proportional-integral-derivative controller (PID) controller 1108, a power electronic (PE) converter 1110, a heliostat unit model 1112, and a conversion unit 1114. The feedback position sensor 1104 is configured to determine the current location of the heliostat 1102 and is further connected to the input 1106. The input 1106 is configured to receive the determined location of the heliostat 1102 from the feedback position sensor 1104 and reference heliostat elevation angle ($\alpha_H^*$)) and reference heliostat azimuth angle ($\gamma_H^*$) from a memory. The PID controller 1108 is configured to determine the difference between the received current location and the references fetched from the memory. Based on the determination, the PID controller 1108 is configured to generate an error signal. The PE converter 1110 is configured to receive the error signal from the PID controller 1108 and the input data from the heliostat 1102 and the generate an output angle $\theta_{out}$. The conversion unit 1114 is connected to the PE converter 1110. The conversion unit 1114 is configured to convert $\theta_{out}$ into the azimuth angle $\gamma_H$ and elevation angles $\alpha_H$.

Examples and Experiments

The following examples are provided to illustrate further and to facilitate the understanding of the present disclosure. Experimental Data and Analysis First Experiment: Determining the solar elevation and solar azimuth angles.

The first experiment was conducted for solar angles for typical days (10th of each month in 2020) based on the longitude of Dhahran, Saudi Arabia. The simulation of the drive tracking system 200 is implemented using MATLAB Simulink software. In an aspect, the solar field longitude was ($\varphi$=50 deg), and the latitude was 26.5 deg. The solar elevation and azimuth angles were calculated using equations (3) and plotted for twelve typical days, as illustrated in FIG. 12A-FIG. 12B.

Figure 12A:
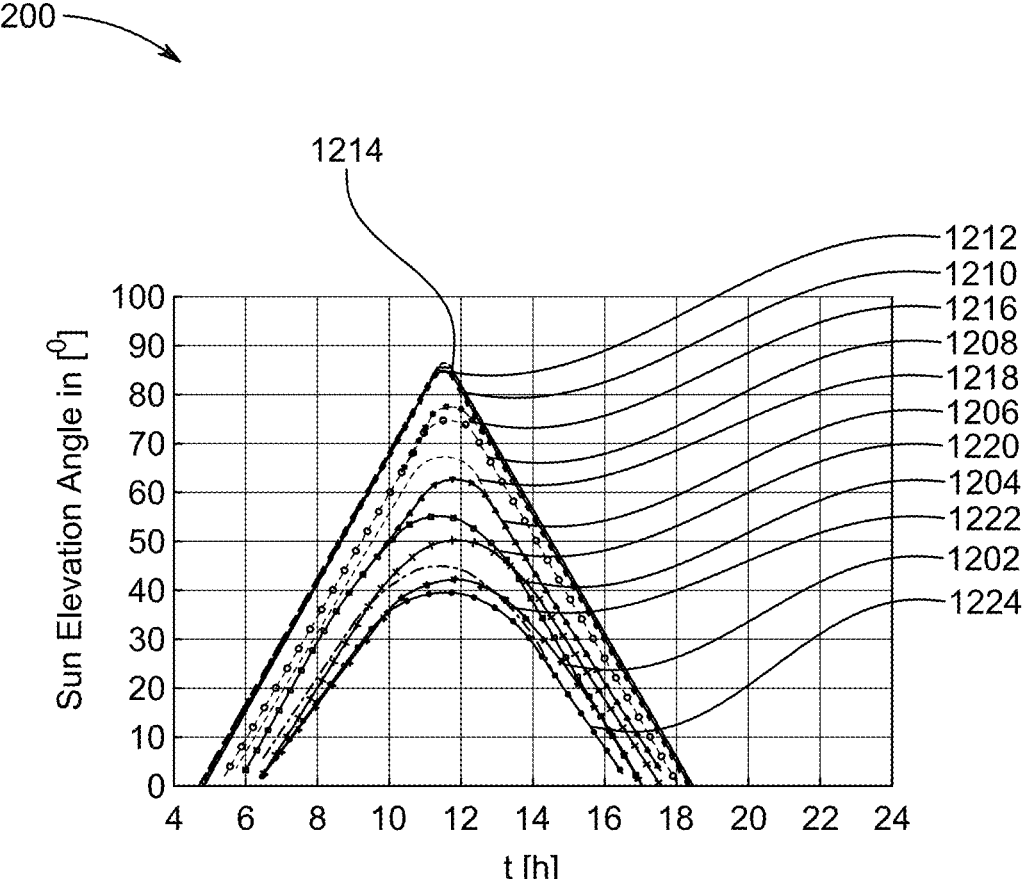
FIG. 12A is an illustration of a solar elevation angle at solar field longitude ($\varphi$=50 deg), according to aspects of the present disclosure.

FIG. 12A is an illustration 1200 of solar elevation angle, as at solar field longitude ($\varphi$=50 deg). As shown in FIG. 12A, signal 1202 represents a solar angle curve for January. Signal 1204 represents a solar angle curve for February, and signal 1206 represents a solar angle curve for March. Signal 1208 represents a solar angle curve for April, and signal 1210 represents a solar angle curve for May. Further, signal 1212 represents a solar angle curve for June. Signal 1214 represents a solar angle curve for July, and signal 1216 represents a solar angle curve for August. Signal 1218 represents a solar angle curve for September, and signal 1220 represents a solar angle curve for October. Signal 1222 represents a solar angle curve for November, and signal 1224 represents a solar angle curve for December.

Figure 12B:
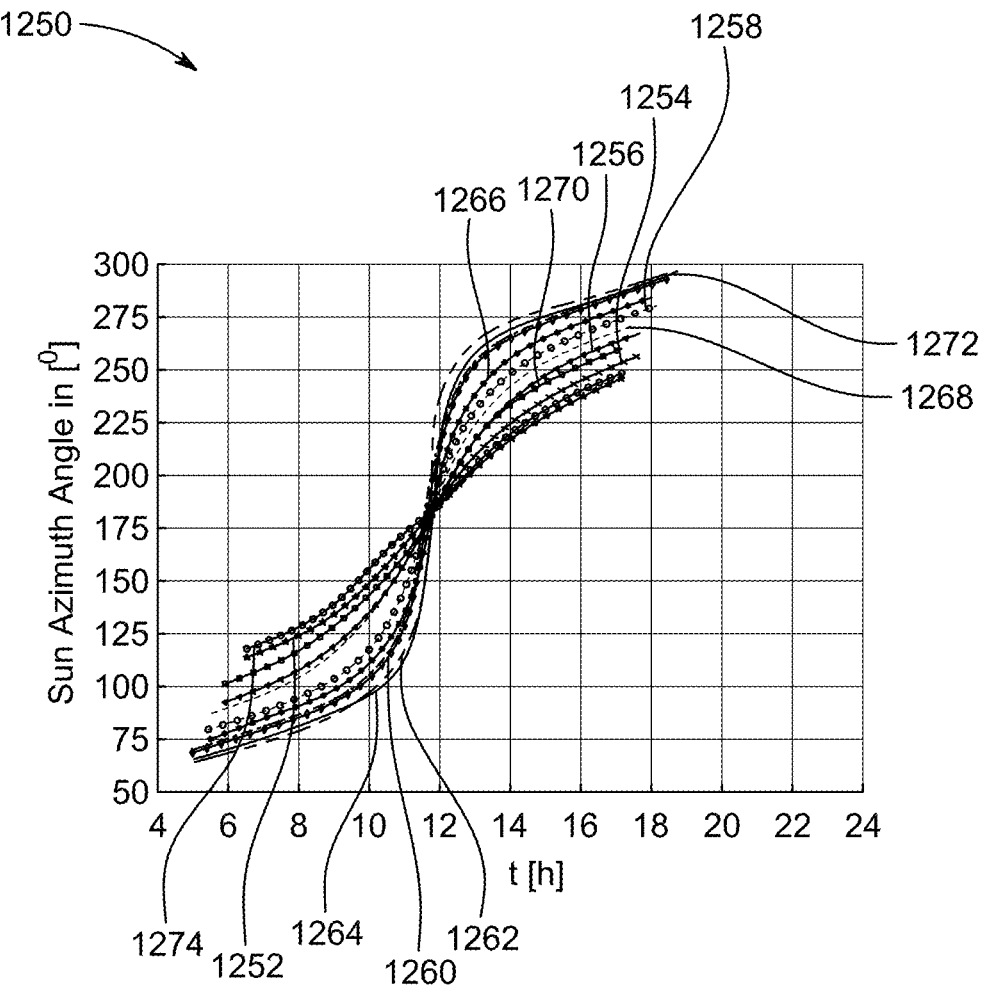
FIG. 12B is an illustration of a solar azimuth angle at solar field longitude ($\varphi$=50 deg), according to aspects of the present disclosure.

FIG. 12B is an illustration 1250 of solar azimuth angle, Ys at solar field longitude ($\varphi$=50 deg). As shown in FIG. 12B, signal 1252 represents a solar angle curve for January. Signal 1254 represents a solar angle curve for February, and signal 1256 represents a solar angle curve for March. Signal 1258 represents a solar angle curve for April, and signal 1260 represents a solar angle curve for May. Further, signal 1262 represents a solar angle curve for June. Signal 1264 represents a solar angle curve for July, and signal 1266 represents a solar angle curve for August. Signal 1268 represents a solar angle curve for September, and signal 1270 represents a solar angle curve for October. Signal 1272 represents a solar angle curve for November, and signal 1274 represents a solar angle curve for December.

Second Experiment: Determining elevation and azimuth angles of the heliostat.

Figure 13A:
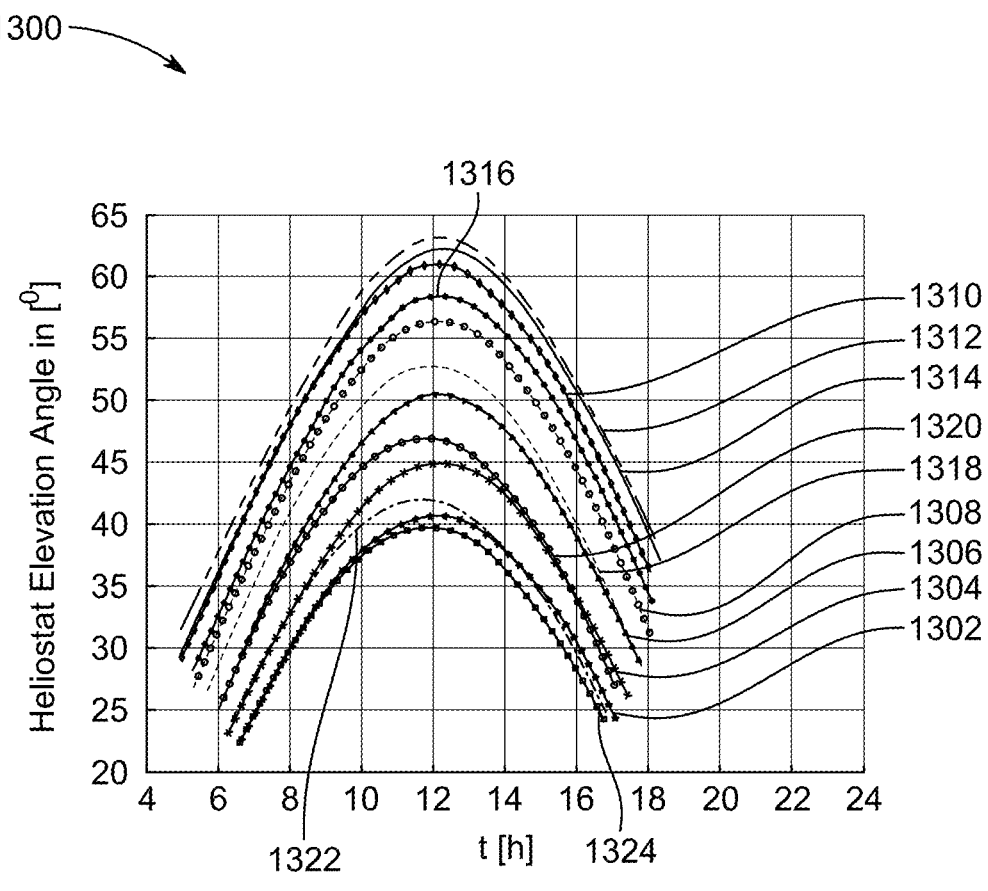
FIG. 13A is an illustration of a heliostat elevation angle, according to aspects of the present disclosure.
Figure 13B:
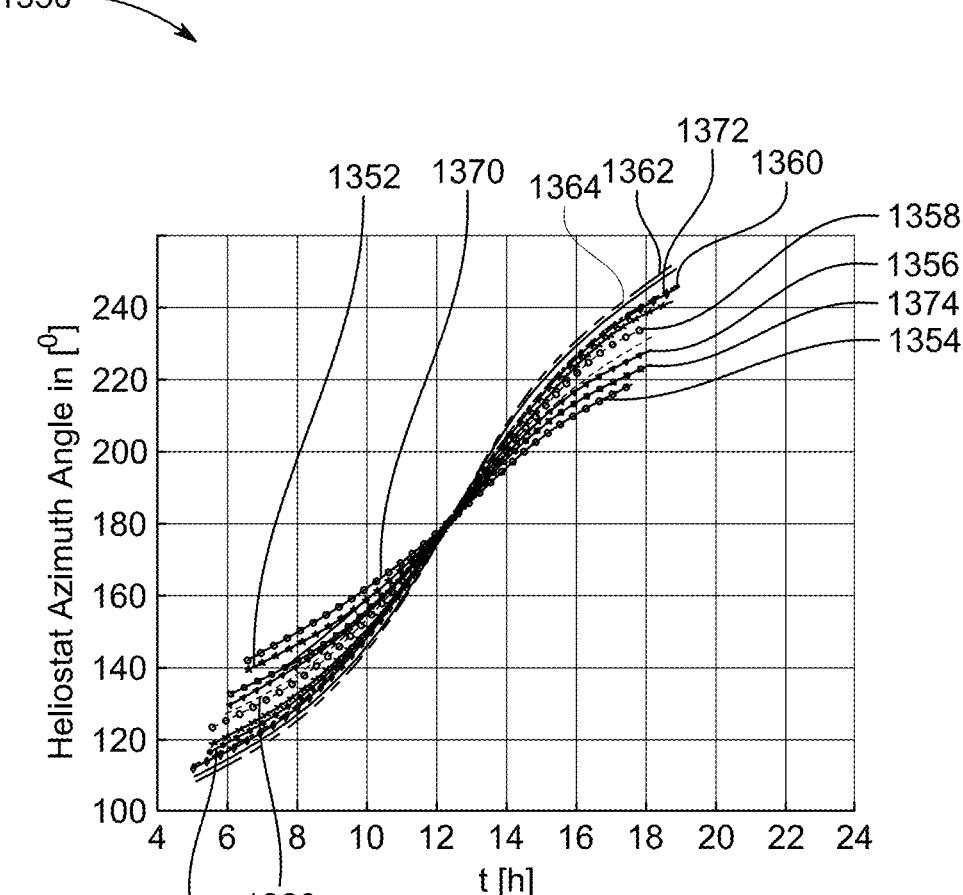
FIG. 13B is an illustration of a heliostat azimuth angle, according to aspects of the present disclosure.

During the second experiment, the elevation and azimuth angles of the heliostat was determined. In an aspect, the tower elevation and azimuth angles are set to 38.7 deg and 170.7 deg. The heliostat angles are illustrated in FIG. 13A-FIG. 13B. FIG. 13A-FIG. 13B verifies that the long sunny day in this location, which is a promising location for CSP applications.

FIG. 13A is an illustration 1300 of the heliostat elevation angle, aH, according to aspects of the present disclosure. As shown in FIG. 13A, signal 1302 represents a heliostat angle curve for January. Signal 1304 represents a heliostat angle curve for February, and signal 1306 represents a heliostat angle curve for March. Signal 1308 represents a heliostat angle curve for April, and signal 1310 represents a heliostat angle curve for May. Further, signal 1312 represents a heliostat angle curve for June. Signal 1314 represents a heliostat angle curve for July, and signal 1316 represents a heliostat angle curve for August. Signal 1318 represents a heliostat angle curve for September, and signal 1320 represents a heliostat angle curve for October. Signal 1322 represents a heliostat angle curve for November, and signal 1324 represents a heliostat angle curve for December.

FIG. 13B is an illustration 1350 of the heliostat azimuth angle, $\gamma$H, according to aspects of the present disclosure. As shown in FIG. 13B, signal 1352 represents a heliostat angle curve for January. Signal 1354 represents a heliostat angle curve for February, and signal 1356 represents a heliostat angle curve for March. Signal 1358 represents a heliostat angle curve for April, and signal 1360 represents a heliostat angle curve for May. Further, signal 1362 represents a heliostat angle curve for June. Signal 1364 represents a heliostat angle curve for July, and signal 1366 represents a heliostat angle curve for August. Signal 1368 represents a heliostat angle curve for September, and signal 1370 represents a heliostat angle curve for October. Signal 1372 represents a heliostat angle curve for November, and signal 1374 represents a heliostat angle curve for December.

Third Experiment: Comparing the recorded elevation and azimuth angles of the heliostat with the reference elevation and azimuth angles.

The third experiment was conducted for several hot weather days to show the drive system performance under several conditions. In an aspect, the experimental data for one whole day (Jul. 15, 2020) from sunrise to sunset is shown here. The scenario was made based on moving the heliostat every 15 min. The 15-minute time duration may not be an optimum time for the drive tracking system 200. However, the 15-minute time duration has been assumed to assess the drive system performance and accuracy of the drive tracking system 200. In an aspect, the drive tracking system 200 may be configured to determine an optimal step time-angle of the drive tracking system 200.

Figure 14A:
FIG. 14A is an illustration of reference angle and tracking angle for the elevation drive of the heliostat, according to aspects of the present disclosure.
Figure 14A:
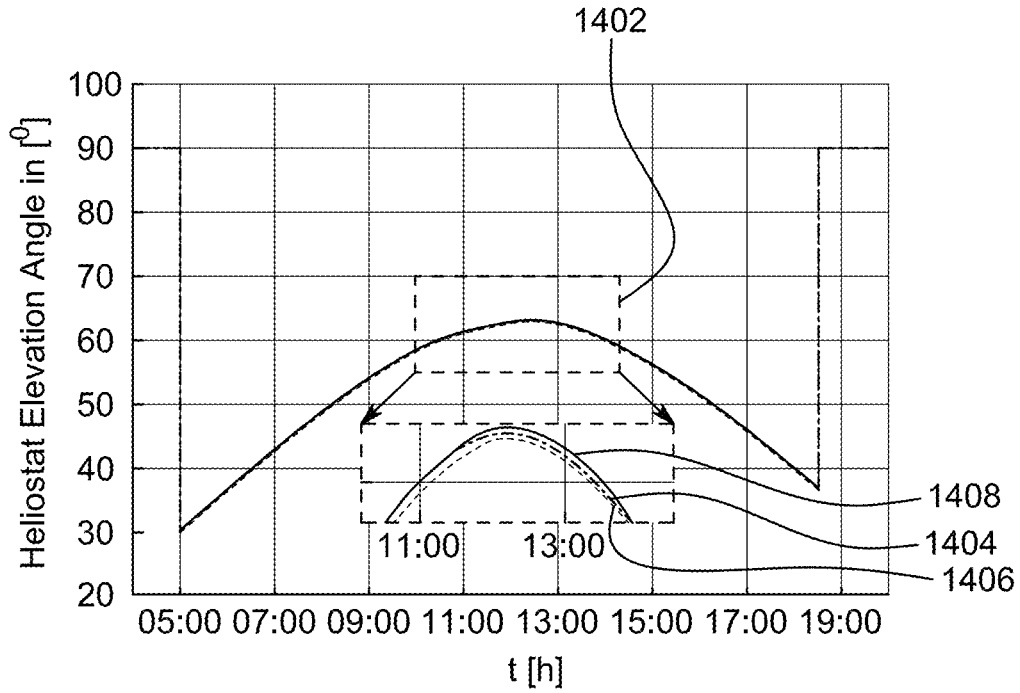

FIG. 14A is an illustration 1400 of reference angle and tracking angle (recorded angle) for the elevation drive of the heliostat at ($\varphi$=50.01 deg, $\alpha_T$=38.7 deg, and $\gamma_T$=170.7 deg). 1402 represents an enlarged view of a heliostat elevation angle curve along the time. Signal 1406 represents experimental data for the elevation drive. Signal 1404 represents reference data for the elevation drive. Signal 1408 represents simulation data for the elevation drive.

Figure 14B:
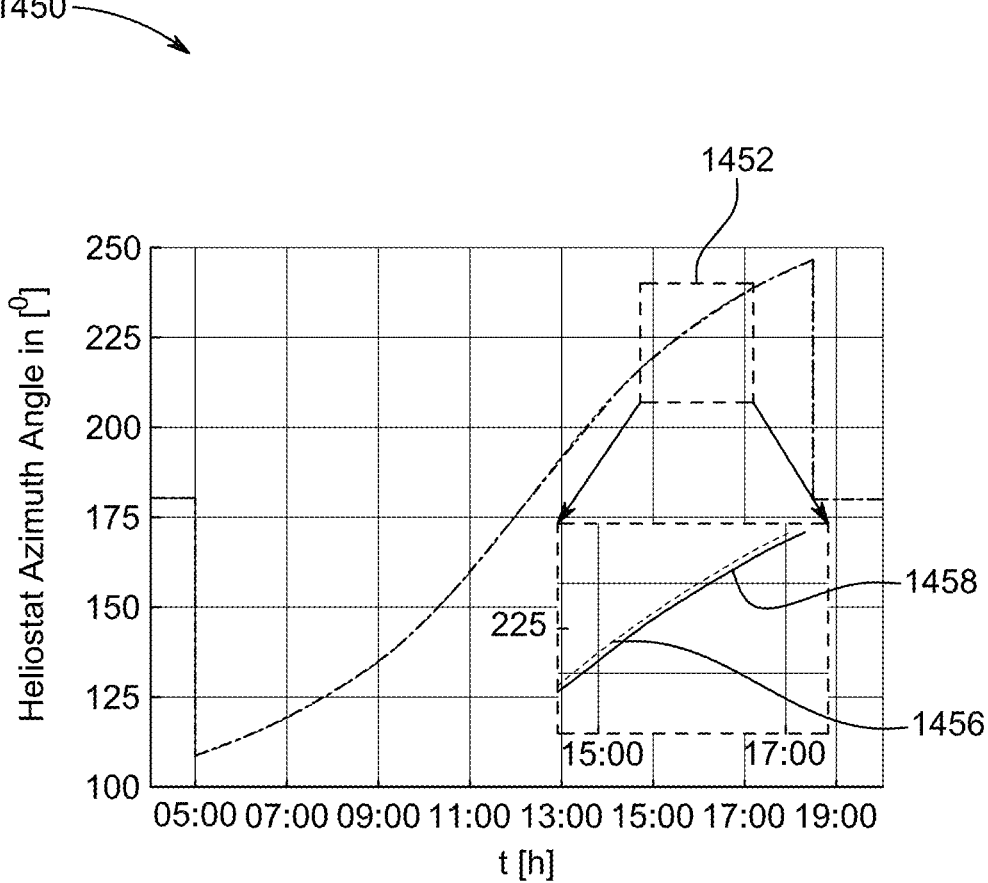
FIG. 14B is an illustration of reference angle and tracking angle for the azimuth drive of the heliostat, according to aspects of the present disclosure.

FIG. 14B is an illustration 1450 of reference angle and tracking angle for the azimuth drive of the heliostat at ($\varphi$=50.01 deg, $\alpha_T$=38.7 deg, and $\gamma_T$=170.7 deg). 1452 represents an enlarged view of a heliostat azimuth angle curve along the time. Signal 1456 represents experimental data for the elevation drive. Signal 1458 represents simulation data for the elevation drive and reference data for the elevation drive.

To evaluate the accuracy of the drive tracking system 200, the third experiment was carried out for one whole hot weather day, from sunrise to sunset, where the azimuth and elevation angles are recorded. First, the heliostat facet 212 started operating from the stow position, the mirror was parallel to the ground. The recorded versus the reference calculated elevation and azimuth angles are shown in FIG. 14A-FIG. 14B. FIG. 14A-FIG. 14B show that the motions started at sunrise (5:00 A.M. at Dhahran on the test day). Then, the drive tracking system 200 could follow the reference heliostat angles accurately along the day, as observed in the FIG. 14A-FIG. 14B. Finally, at sunset time (6:30 P.M.), the heliostat drive returned the mirror to the stow position. FIG. 14A-FIG. 14B reflect that the drive tracking system 200 was able follow the reference angles properly. To evaluate the accuracy, the target, which simulates the tower in the SPT field, was selected as a fixed place on the building rooftop.

Fourth Experiment: Analyzing transient motion of the heliostat.

During the fourth experiment, the transient motion of the heliostat was tracked during a day. FIG. 15A-FIG. 15F represents transient motion of the heliostat for reflecting sunbeams to the target at different times.

FIG. 15A-FIG. 15F declares the heliostat operation at six different instants, starting from 7:00 A.M. to 6:00 P.M. The mirror could reflect the sunbeams to the desired target with accurate tracking error is extremely small, as illustrated by FIG. 15A-FIG. 15F. For a heliostat at a distance of 6.3 m north from the tower, a tracking error of 1.3 mrad (equivalent to a 0.07 deg) was calculated, which results in a slight offset between the heliostat's desired aim point and the actual position of the heliostat focus on the desired point. In an aspect, a programmed algorithm may be employed with the drive system 200 and the heliostat moving from east to west.

Figure 15A:
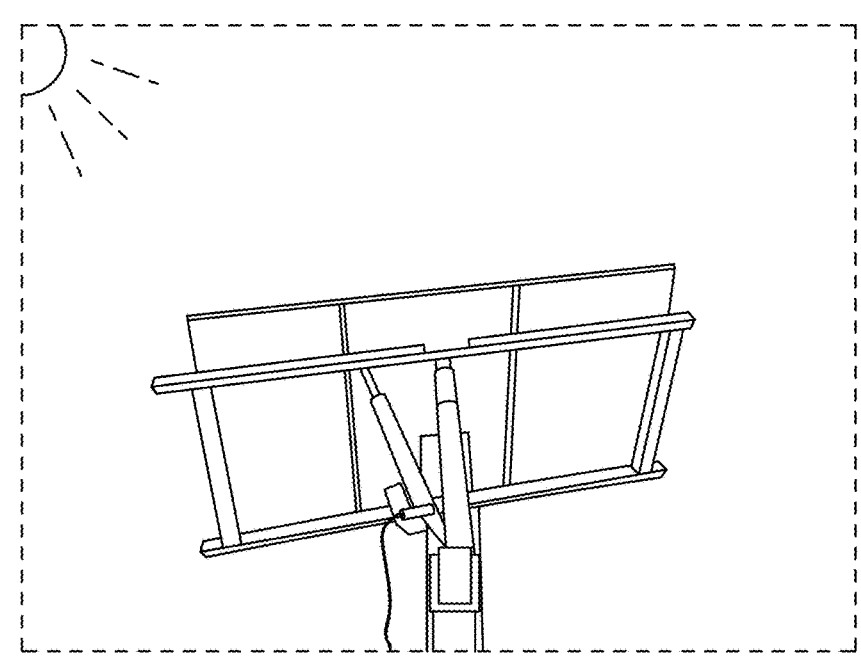
FIG. 15A is an illustration of a transient motion of the heliostat for the reflecting sunbeams to the target at 9 A.M., according to aspects of the present disclosure.

FIG. 15A is an illustration 1502 of the transient motion of the heliostat at 9 A.M.

Figure 15B:
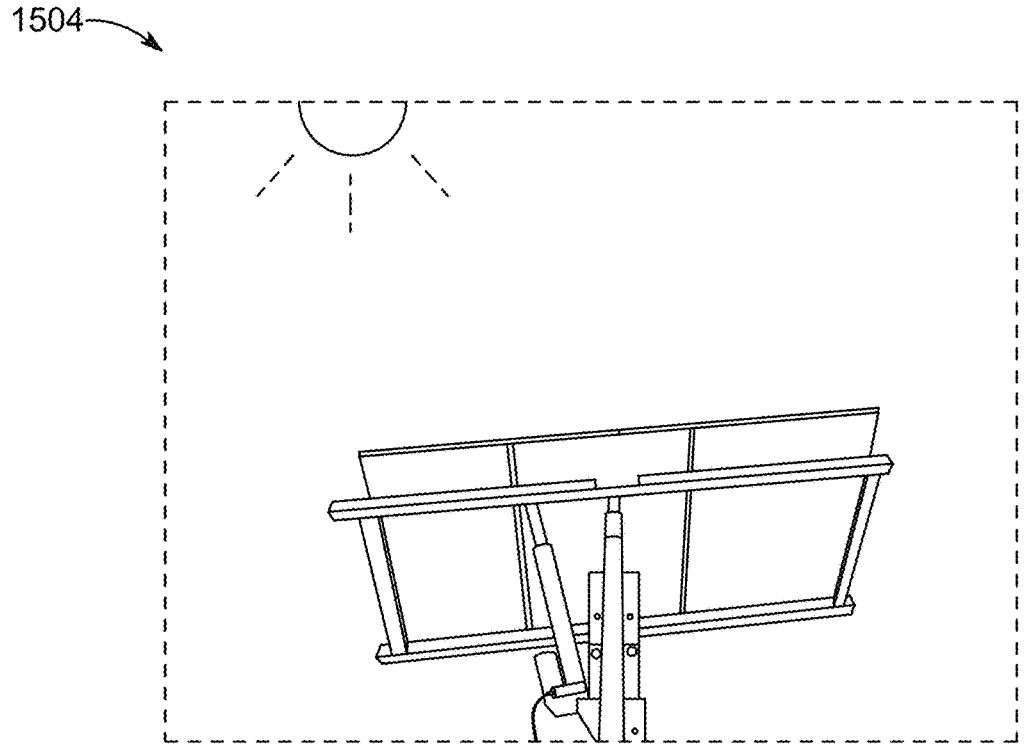
FIG. 15B is an illustration of a transient motion of the heliostat for the reflecting sunbeams to the target at 10 A.M., according to aspects of the present disclosure.

FIG. 15B is an illustration 1504 of the transient motion of the heliostat at 10 A.M.

Figure 15C:
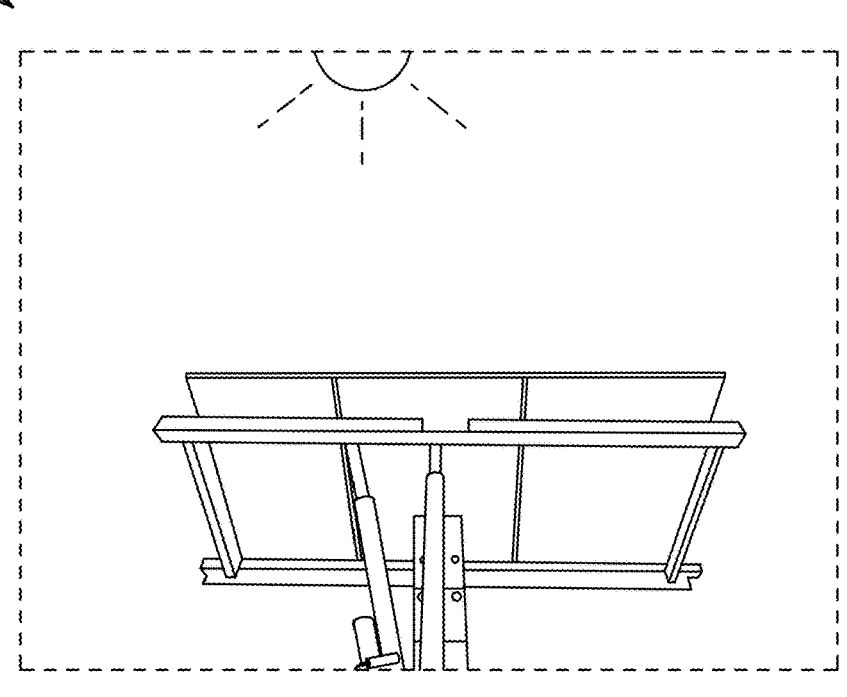
FIG. 15C is an illustration of a transient motion of the heliostat for the reflecting sunbeams to the target at 11 A.M., according to aspects of the present disclosure.

FIG. 15C is an illustration 1506 of the transient motion of the heliostat at 11 A.M.

Figure 15D:
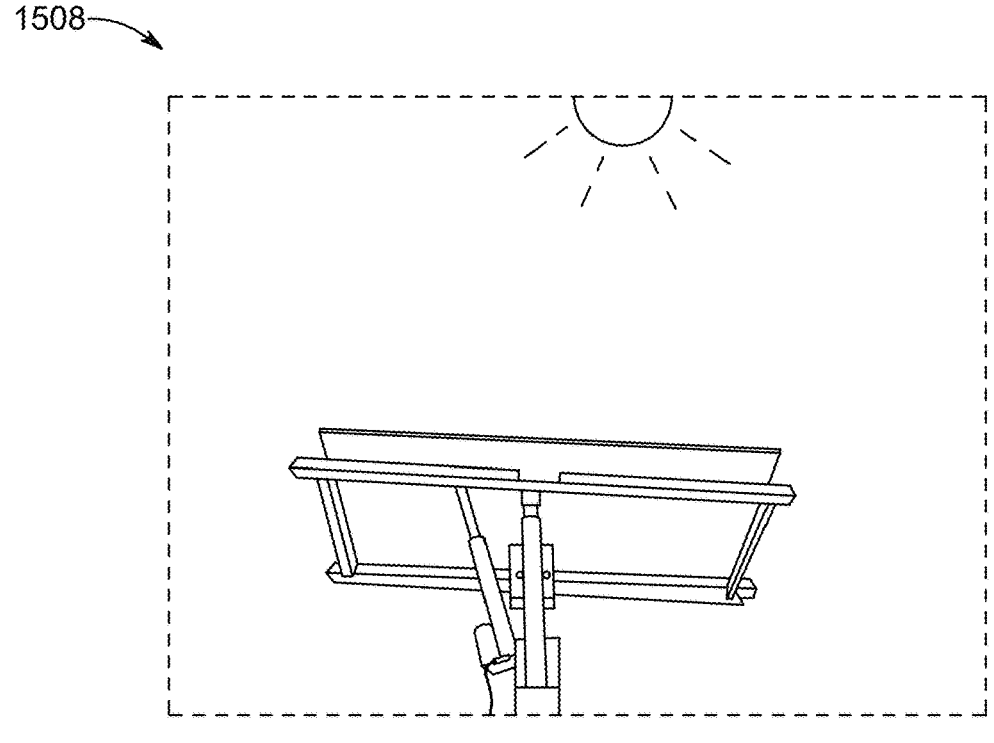
FIG. 15D is an illustration of a transient motion of the heliostat for the reflecting sunbeams to the target at 12 P.M., according to aspects of the present disclosure.

FIG. 15D is an illustration 1508 of the transient motion of the heliostat at 12 P.M.

Figures 15E, 15F:
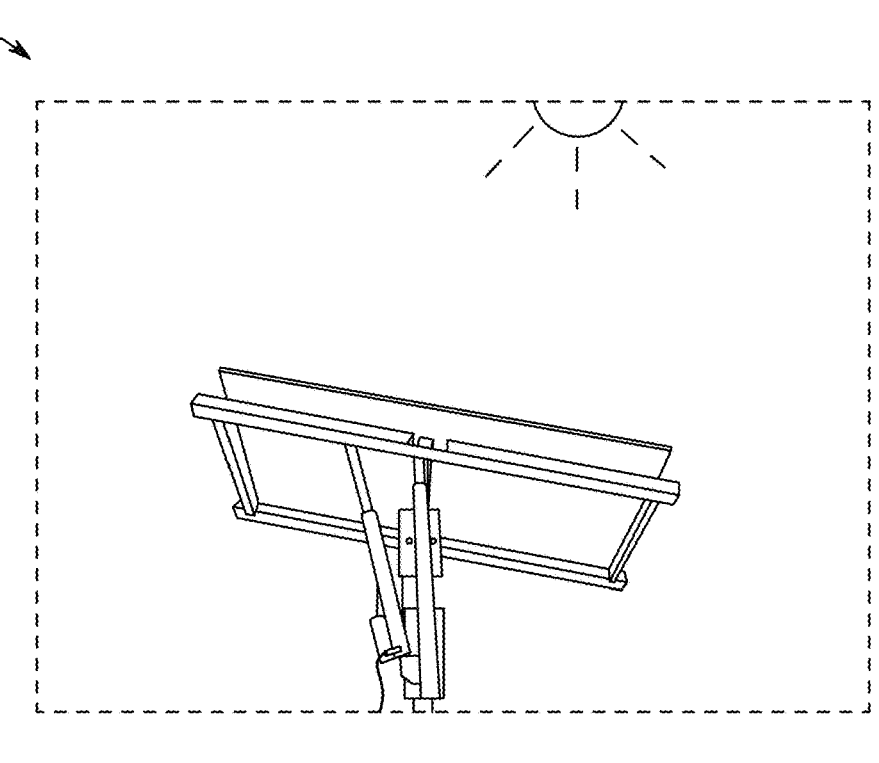
FIG. 15E is an illustration of a transient motion of the heliostat for the reflecting sunbeams to the target at 1 P.M., according to aspects of the present disclosure.
FIG. 15F is an illustration of a transient motion of the heliostat for the reflecting sunbeams to the target at 2 P.M., according to aspects of the present disclosure.

FIG. 15E is an illustration 1510 of the transient motion of the heliostat at 1 P.M.

FIG. 15F is an illustration 1512 of the transient motion of the heliostat at 2 P.M.

In order to assess the effectiveness of the drive tracking system 200, two different case studies (a case at sunrise and a case in the afternoon) have been performed. These cases are applied based on the numerical values of the parameters listed along with all motor parameters in the Appendix 1. The various cases are discussed in detail in the following subsections.

APPENDIX 1:

| Motor parameters | |
| --- | --- |
| Description | Value |
| Mirror size (m²) | 1.2 × 0.7 |
| Heliostat high | 1.85 m |
| Target to heliostat distance | 6.3 m |
| Tower elevation angle | 38.7 deg |
| Tower azimuth angle | 170.7 deg |
| $l_{min}$ (cm) | 30.7 |
| $l'_{min}$ (cm) | 45 |
| l(cm) | 0 → 15 |
| Target high (m) | 7.48 |
| Azimuth heliostat angle | 142.77 deg |
| y(cm) | 53 |
| y'(cm) | 68 |
| R(cm) | 21 |
| R'(cm) | 20 |
| l'(cm) | 0 → 30 |
| $J_m$ (kg · m²) | $2.8 \times 10^{-5}$ |
| $K_t$(Nm/A) | $5.37 \times 10^{-3}$ |
| $L_a$(H) | $1.2 \times 10^{-3}$ |
| P(mm) | 3.5 |
| Ra (Ω) | 1.34 |
| $\eta$s(%) | 85 |
| Proportional integral (PI) elevation drive constants | $K_p = 1.02, K_i = 7.92$ |
| PI azimuth drive constants | $K_p = 0.75, K_i = 6.92$ |

Figures 16A, 16B:
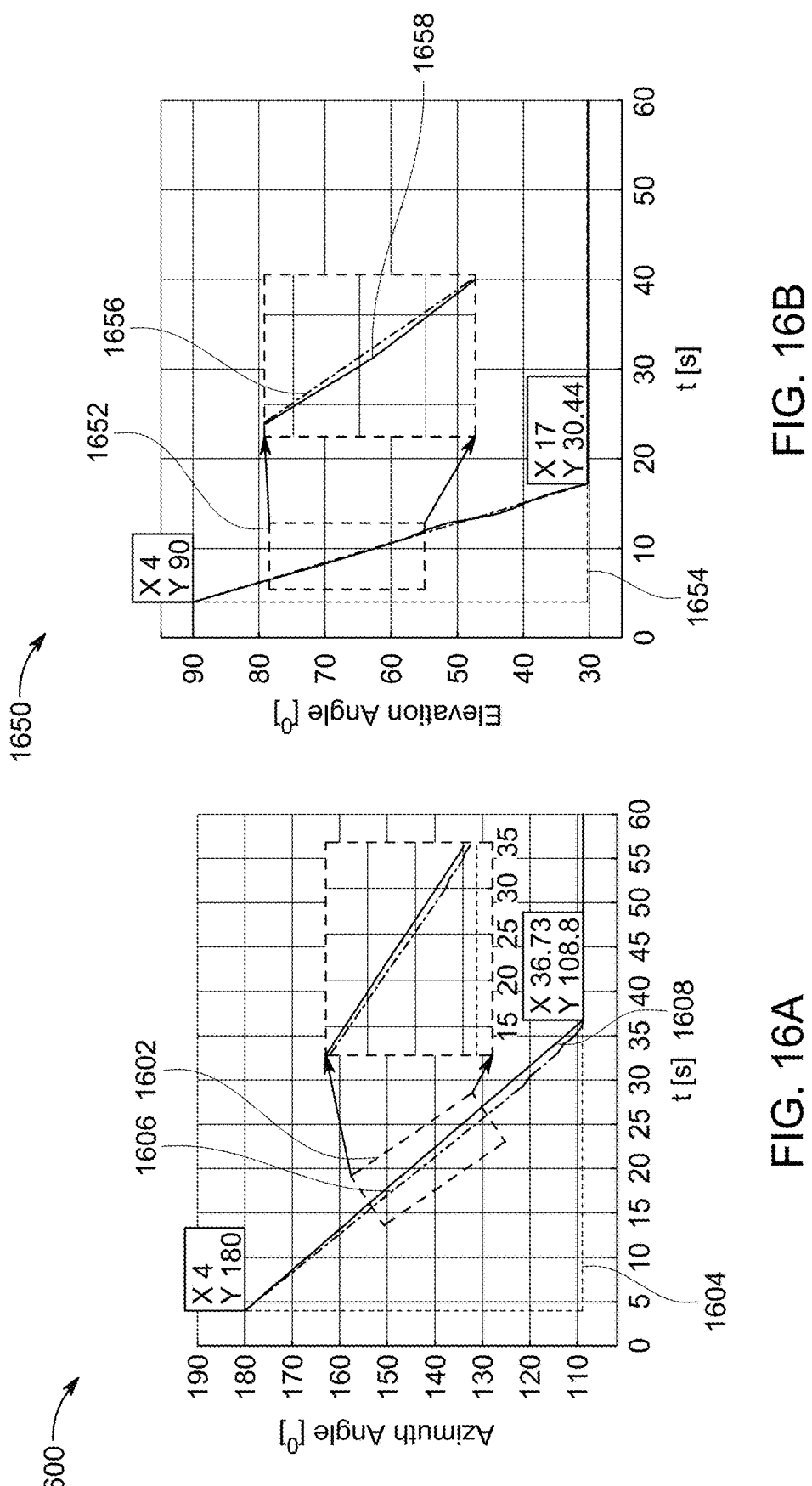
FIG. 16A is an illustration of simulated and experimented reference angle and tracking angle at sunrise for the azimuth drive of the heliostat, according to aspects of the present disclosure.
FIG. 16B is an illustration of simulated and experimented reference angle and tracking angle at sunrise for the elevation drive of the heliostat, according to aspects of the present disclosure.

Case 1: Sunrise Time: The motion started from a stow position, $\gamma_H$=180 deg and $\alpha_H$=90 deg with MPU feedback sensor values are $\beta$=180 deg and $\aleph$=90 deg to first desired angles at 5:00 A.M. $\gamma_H{}^*$=108.75 deg and $\alpha_H{}^*$=59.57 deg as described in FIG. 16A-FIG. 16B. FIG. 16A is an illustration 1600 of simulated and experimented reference angle and tracking angle at sunrise for the azimuth drive of the heliostat at ($\varphi$=50.01 deg, $\alpha_T$=38.7 deg, and $\gamma_T$=170.7 deg). 1602 represents a window that represents an enlarged view of an azimuth angle curve along the time. Signal 1606 represents experimental data for the azimuth drive. Signal 1604 represents reference data for the azimuth drive. Signal 1608 represents simulation data for the azimuth drive.

FIG. 16B is an illustration 1650 of simulated and experimented reference angle and tracking angle at sunrise for elevation drive of the heliostat ($\varphi$=50.01 deg, $\alpha_T$=38.7 deg, and $\gamma_T$=170.7 deg). 1652 represents a window that represents an enlarged view of an elevation angle curve along the time. Signal 1656 represents experimental data for the elevation drive. Signal 1654 represents reference data for the elevation drive. Signal 1658 represents simulation data for the elevation drive. In the experiments, the azimuth heliostat drive and the elevation heliostat drive is configured to achieve the reference angle in 32.73 s and 13 s for azimuth and elevation, respectively, with acceptable steady-state errors.

TABLE 1

Steady-state errors for the case studies

| | Steady-state error | Simulation | Experiments |
|---|---|---|---|
| Case #1 | $\gamma_{err}$ % | 0.32 | 0.35 |
| | $\alpha_{err}$ % | 0.14 | 0.15 |
| Case #2 | $\gamma_{err}$ % | 0.33 | 0.34 |
| | $\alpha_{err}$ % | 0.20 | 0.18 |

In an aspect, the azimuth and elevation heliostat drives performance was measured practical. Starting from the instant t=4 s, the two azimuth and elevation heliostat drives move toward the reference values. The results have been approximately verified by the simulations settling time, which is 34 s and 14 s for azimuth and elevation drives, respectively. The steady-state errors is calculated based on equation (18) and are listed in Table 1, where the base values are $\gamma_{base}$=145 deg and $\alpha_{base}$=75 deg.

$$\gamma_{err} = \frac{\gamma^* - \gamma_{meas}}{\gamma_{base}}$$ (18)

$$\alpha_{err} = \frac{\alpha^* - \alpha_{meas}}{\alpha_{base}}$$

Table 1 shows that experimental results of both azimuth and elevation heliostat drives have acceptable steady-state errors like that of simulation results. This demonstrates how the system can reflect the sunbeams accurately.

Figure 17:
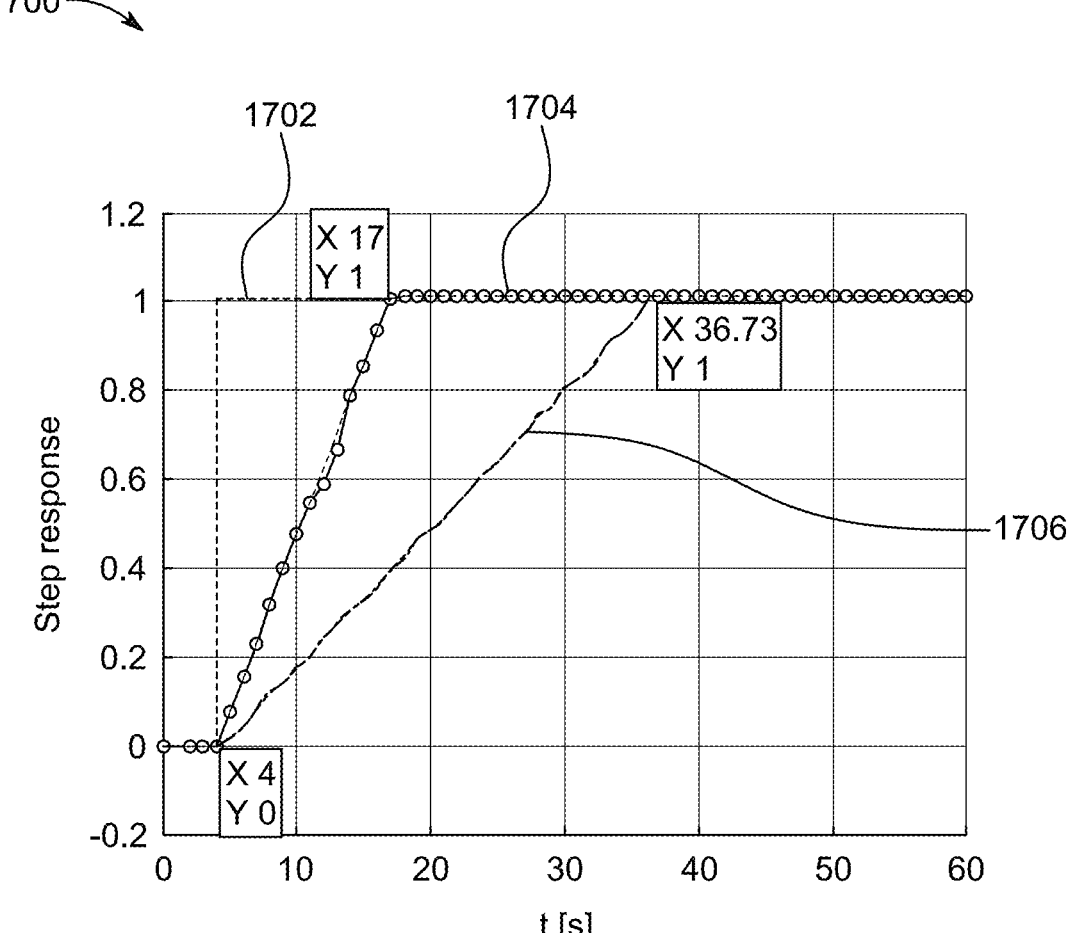
FIG. 17 is an illustration of a step response for azimuth and elevation drives at sunrise for the heliostat at sunrise with acceptable steady-state errors, according to aspects of the present disclosure.

FIG. 17 is an illustration 1700 of step response for azimuth and elevation drives at sunrise for the heliostat at (φ=50.01 deg, $\alpha_T$=38.7 deg, and $\gamma_T$=170.7 deg) with acceptable steady-state errors. The step response for both azimuth and elevation heliostat drives indicates the tracking response the drive system 200. 1702 represents reference data for the azimuth drive and elevation drive. Signal 1704 represents experimental data and simulation data for the elevation drive. Signal 1706 represents experimental data and simulation data for the azimuth drive.

Figure 18:
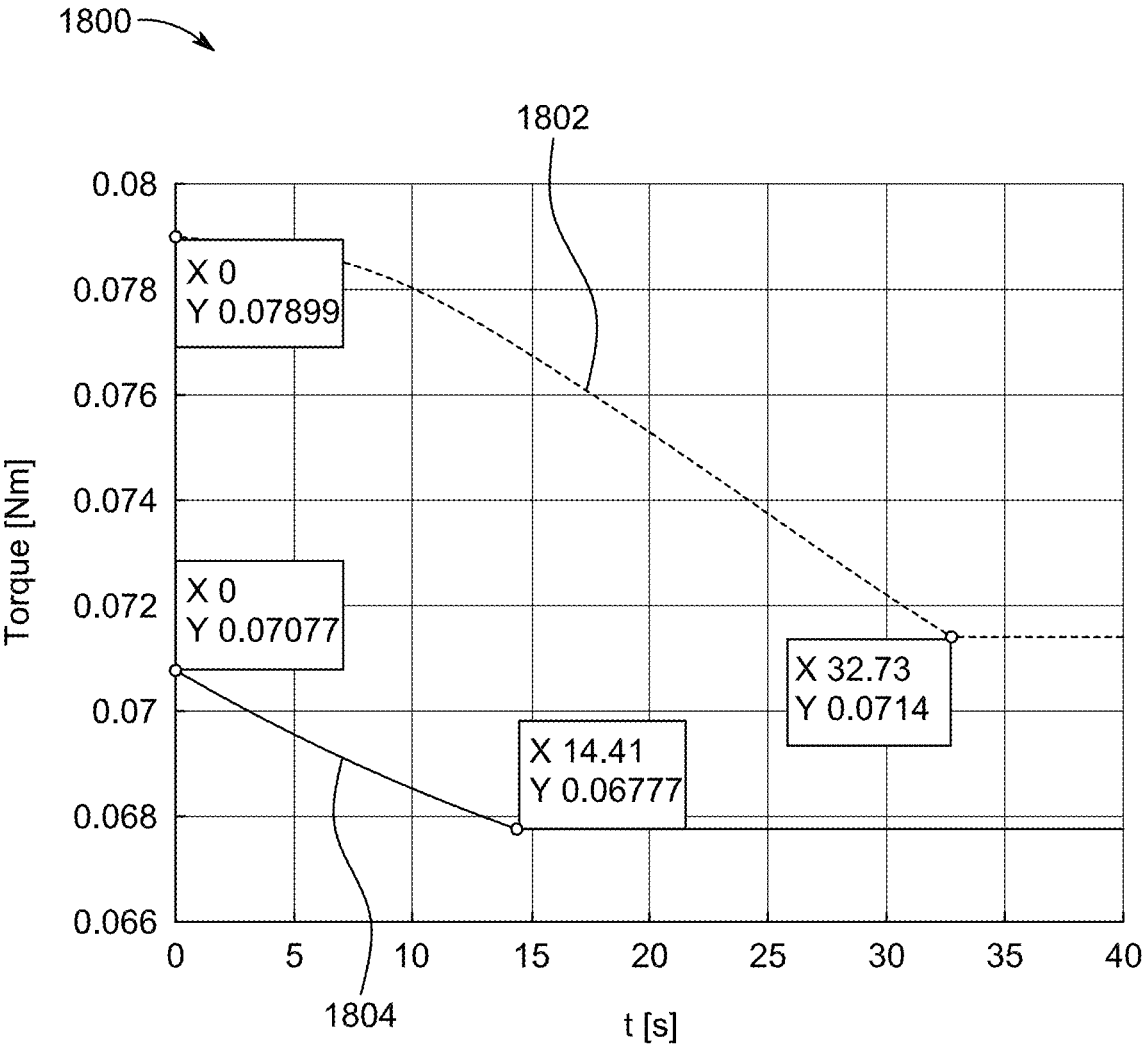
FIG. 18 is an illustration of a stimulated load torque at sunrise for azimuth drive and the elevation drive, according to aspects of the present disclosure.

FIG. 18 is an illustration 1800 of a stimulated load torque at sunrise for azimuth drive at ($K_p$=0.75 and $K_i$=6.92) and elevation drive at ($K_p$=1.02 and $K_i$=7.92). To display the drive system performance, the load torque performance for both heliostat drives is recorded. 1802 represents stimulated load torque for the azimuth drive. Signal 1804 represents simulation stimulated load torque for the elevation drive.

Case 2: At 10:30 A.M. Time Position: In Case 2, the present drive system 200 was considered at 10:30 A.M. on Jul. 15, 2020. During the case 2, it was concluded that the time response for the azimuth and elevation drives has been decreased as compared to Case 1.

Figure 19A:
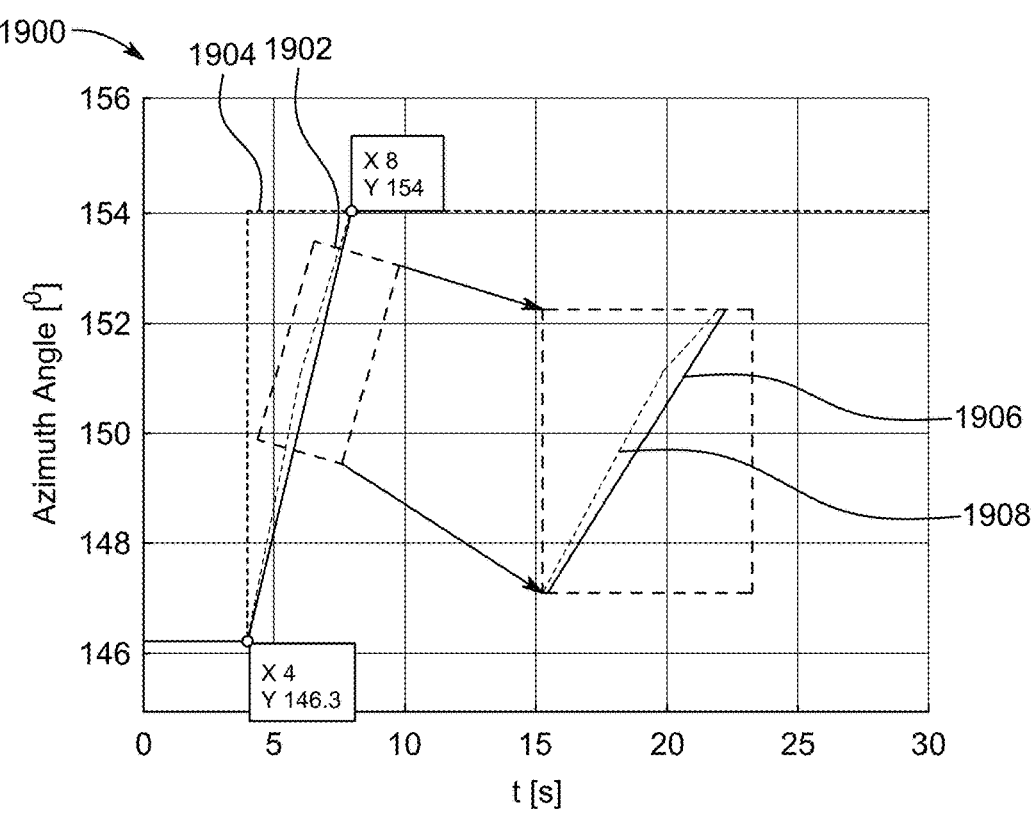
FIG. 19A is an illustration of simulated and experimented reference and tracking angles at 10:30 A.M. for azimuth drive, according to aspects of the present disclosure.

FIG. 19A is an illustration 1900 of reference angle, simulated tracking angle (recorded angle) and experimented tracking angle at 10:30 A.M. for azimuth drive for the heliostat at (φ=50.01 deg, $\alpha_T$=38.7 deg, and $\gamma_T$=170.7 deg). 1902 represents a window that represents an enlarged view of a heliostat azimuth angle curve along the time. Signal 1906 represents simulation data for the azimuth drive. Signal 1904 represents reference data for the azimuth drive. Signal 1908 represents experimental data for the azimuth drive.

Figure 19B:
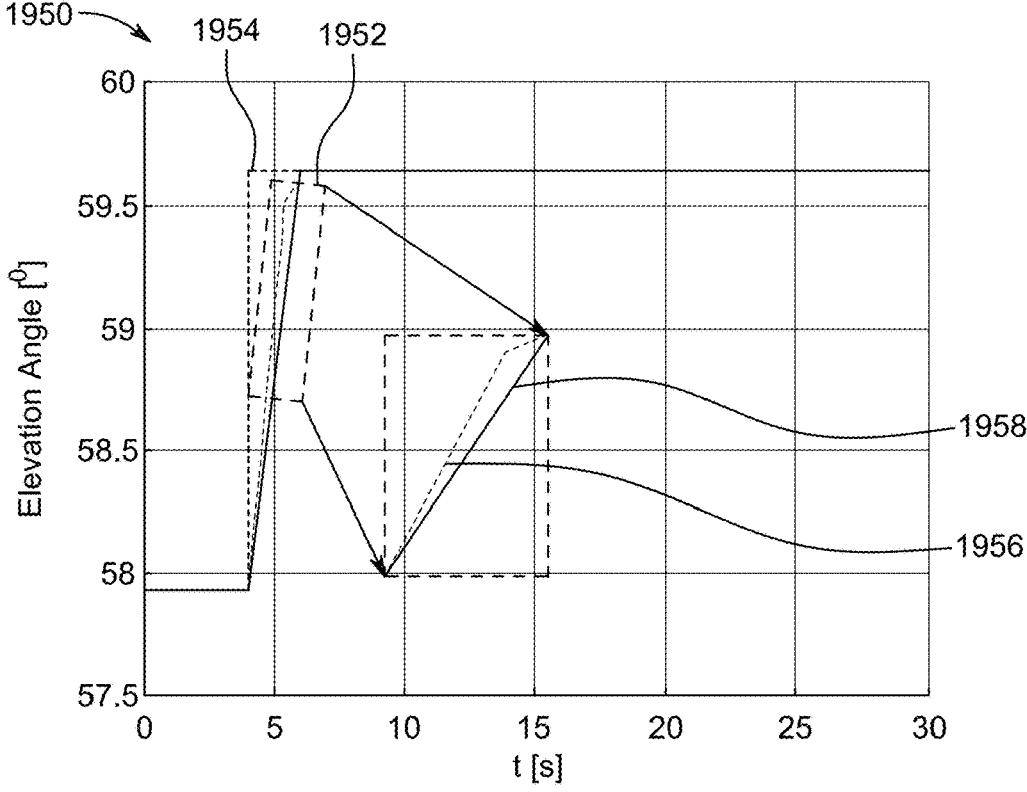
FIG. 19B is an illustration of simulated and experimented reference and tracking angles at 10:30 A.M. for elevation drive, according to aspects of the present disclosure.

FIG. 19B is an illustration 1950 of reference angle, simulated tracking angle (recorded angle), and experimented tracking angle at 10:30 A.M. for elevation drive for the heliostat at (φ=50.01 deg, $\alpha_T$=38.7 deg, and $\gamma_T$=170.7 deg). 1952 represents an enlarged view of a heliostat elevation angle curve along the time. Signal 1956 represents experimental data for the elevation drive. Signal 1958 represents simulation data for the elevation drive. Signal 1954 represents reference data for the elevation drive.

FIG. 19A-FIG. 19B show the performance of the azimuth and elevation drives where the simulation and experiment were applied at reference angles $\gamma_H$*=54 deg and $\alpha_H$*=59.65 deg for the azimuth and elevation heliostat drives. The tracking started from the previous setpoint at 10:00 A.M., and the angles were $\gamma_H$=146.3 deg and $\alpha_H$=57.93 deg with the same feedback sensor angles are β=146.3 deg and ℵ=57.93 deg. The azimuth and elevation drives follow their reference values after 4.15 s and 2 s, with acceptable steady-state errors.

Table 1 shows that both drives' experimental results have good steady-state errors similar to simulation results. This demonstrates the capability of the drive system 200 to reflect the sunbeams accurately.

Figure 20:
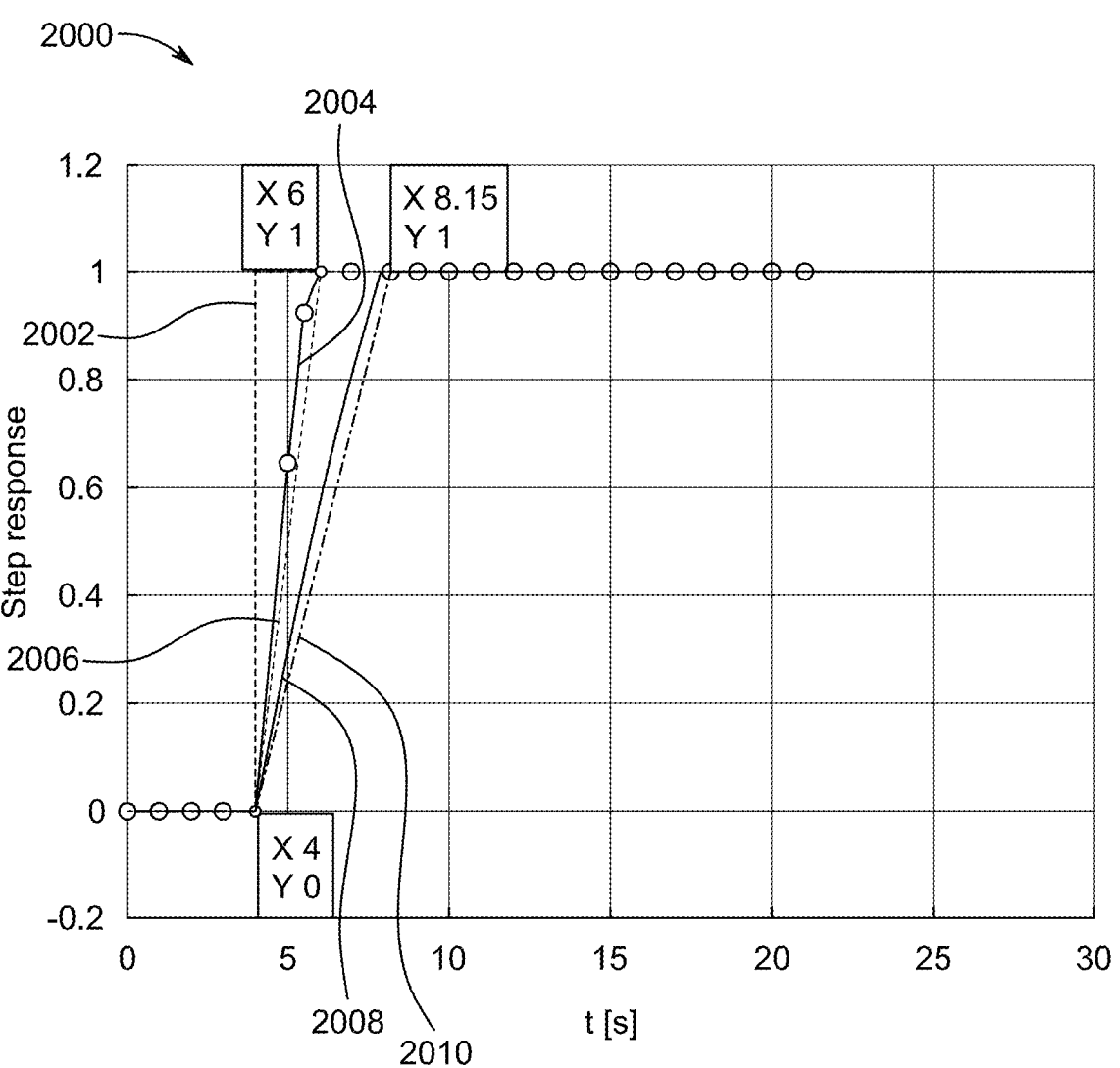
FIG. 20 is an illustration of a step response for azimuth and elevation drives at 10:30 A.M., according to aspects of the present disclosure.

FIG. 20 is an illustration 2000 of a step response for the azimuth and elevation drives at 10:30 A.M. for the heliostat at (φ=50.01 deg, $\alpha_T$=38.7 deg, and $\gamma_T$=170.7 deg). 2002 represents reference data for the azimuth drive and the elevation drive. Signal 2004 represents experimental data for the elevation drive. Signal 2006 represents simulation data for the elevation drive. Signal 2008 represents experimental data for the azimuth drive. Signal 2010 represents simulation data for the azimuth drive.

Also, the step response for both drives has been reflected in FIG. 20, which validates the tracking response for the heliostat drive models and implements a prototype for reference position angles. Similarly, to assess the effectiveness of heliostat drives performance, the average motor current for this period at a steady state for the two drivers is evaluated and simulated.

Figure 21A:
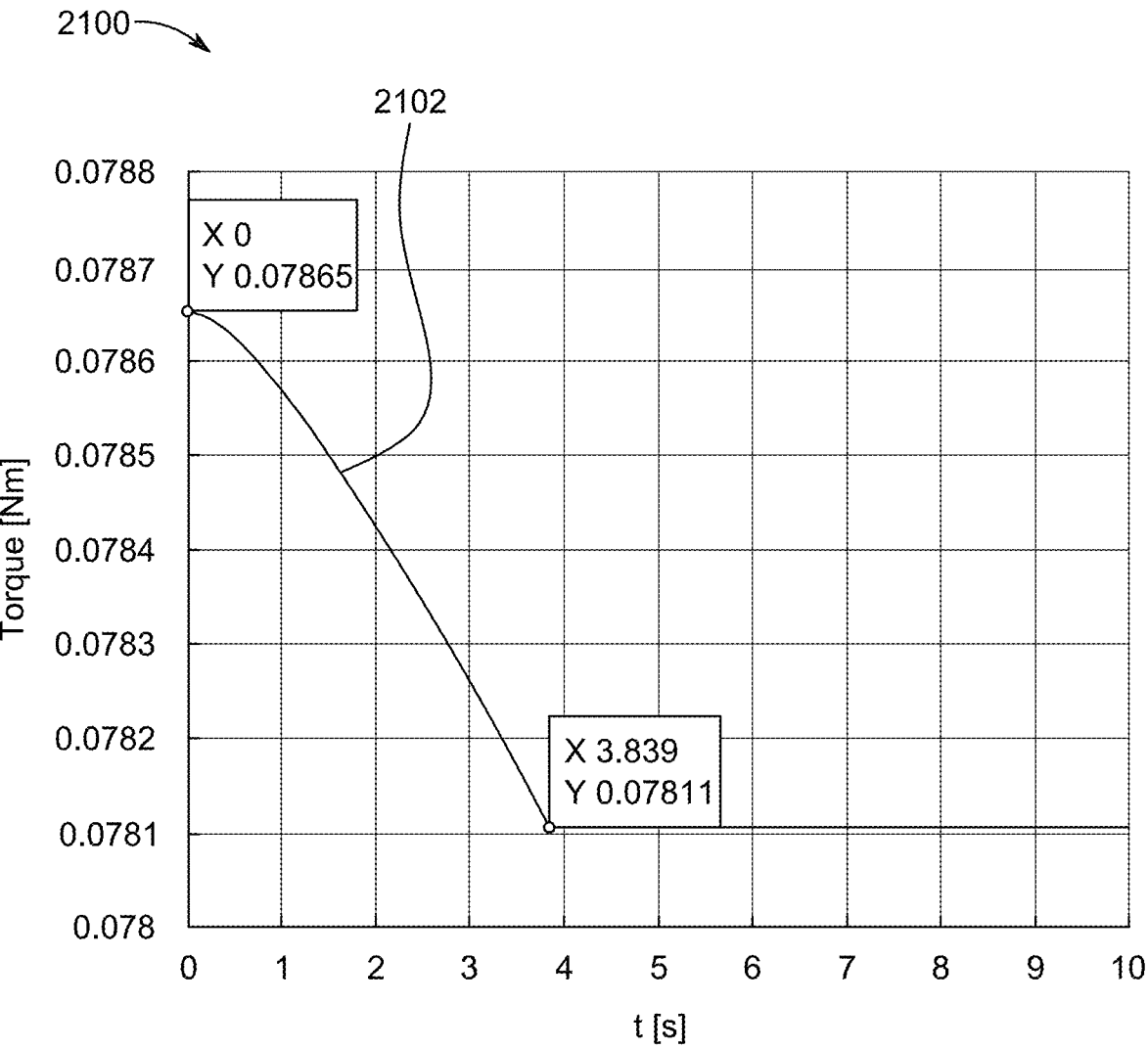
FIG. 21A is an illustration of a torque at 10:30 A.M. for stimulated azimuth heliostat drive model, according to aspects of the present disclosure.

FIG. 21A is an illustration 2100 of a torque at 10:30 A.M. for stimulated azimuth drive of the heliostat having ($K_p$=0.75 and $K_i$=6.92). 2102 represents stimulated torque data for the azimuth drive.

Figure 21B:
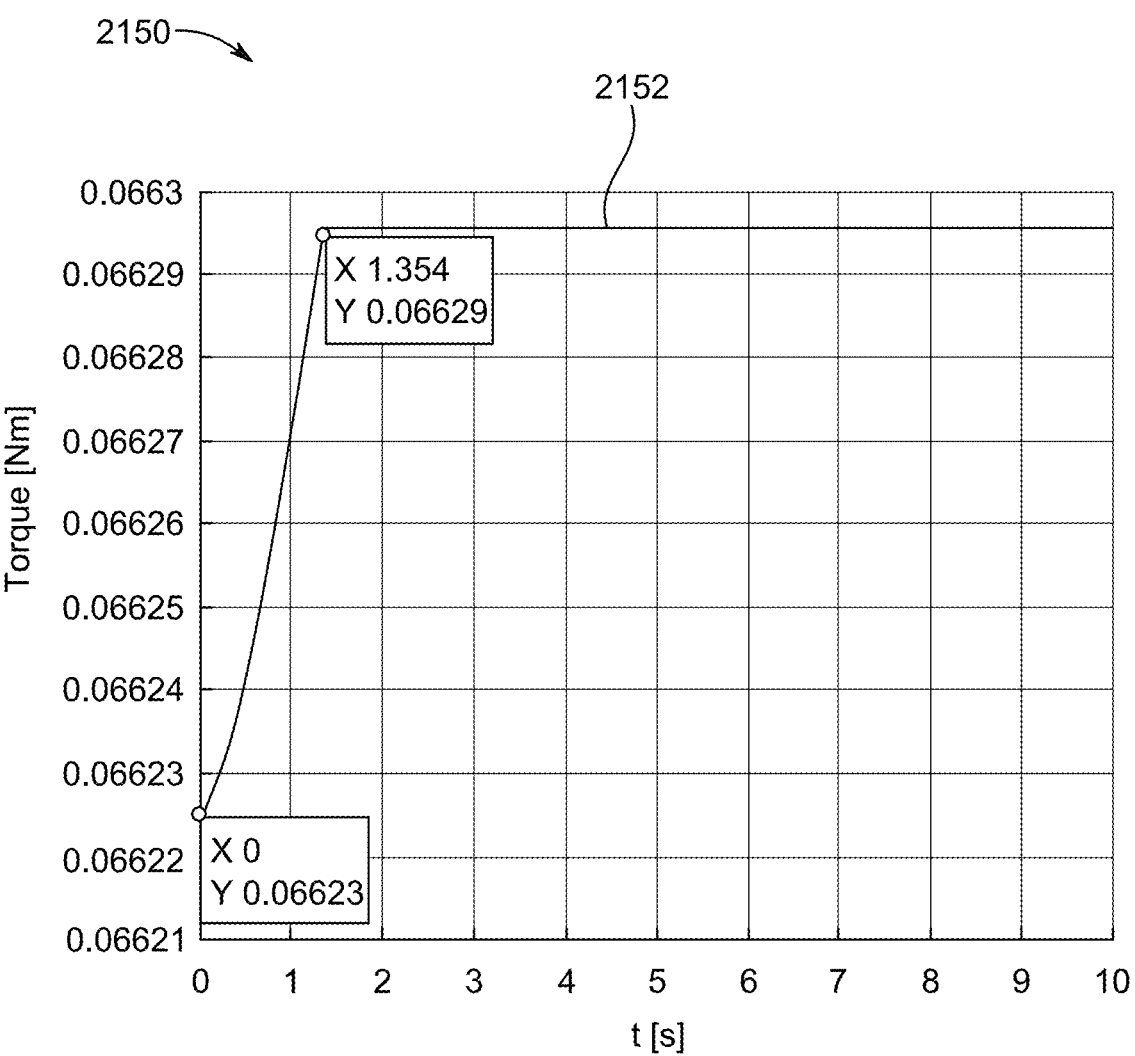
FIG. 21B is an illustration of a torque at 10:30 A.M. for stimulated heliostat drive model, according to aspects of the present disclosure.

FIG. 21B is an illustration 2150 of a torque at 10:30 A.M. for stimulated elevation drive of the heliostat having ($K_p$=1.02 and $K_i$=7.92). 2152 represents stimulated torque data for the azimuth drive. Based on equation (16), the load torque performance is affected for both azimuth and elevation drives, as shown in FIG. 21A-FIG. 21B. It is clear from Table 1 that the experimental results match the simulation results with errorless that 0.03% in all cases considered.

Numerous modifications and variations of the present disclosure are possible in light of the above teachings. It is therefore to be understood that within the scope of the appended claims, the invention may be practiced otherwise than as specifically described herein.

The invention claimed is:
1. A drive tracking system, comprising:
a heliostat structure, a power electronic converter, and a tracking controller,
wherein the heliostat structure comprises a heliostat support frame, a plurality of linear actuators, and a heliostat facet,
wherein a first end of each of the plurality of linear actuators is connected to an underside of the heliostat facet, wherein a second end of each of the plurality of linear actuators is connected to the heliostat support frame, wherein the power electronic converter comprises a plurality of direct current (DC) chopper converters mechanically coupled to the plurality of linear actuators via a worm gear system, the worm gear system comprising a plurality of worm gears and a plurality of linear screws, wherein the tracking controller comprises a three-axis gyroscopic sensor and a microcontroller, the three-axis gyroscopic sensor being mounted on a rear surface of the heliostat facet, the three-axis gyroscopic sensor being wired to the microcontroller, wherein the microcontroller is configured with instructions to control the plurality of DC choppers converters based on data provided by the three-axis gyroscopic sensor, wherein the plurality of linear actuators is controlled by the plurality of DC chopper converters, the plurality of DC chopper converters providing a varying voltage to a plurality of permanent magnetic motors, the plurality of permanent magnetic motors being mechanically coupled to the plurality of linear actuators, the varying dc voltage adjusting the rotational speed of the plurality of permanent magnetic motors, the rotational speed of the plurality of permanent magnetic motors altering the speed of extension of the plurality of linear actuators, the varying dc voltage determined by the tracking controller.

2. The drive tracking system of claim 1, wherein the plurality of linear actuators comprises at least two linear actuators, wherein the first end of a first linear actuator attaches to the base of the underside of the heliostat facet in line with the central axis of the heliostat support frame, the second end of the first linear actuator attaching to the heliostat support frame, wherein the first end of a second linear actuator attaches to the underside of the heliostat facet offset to the central axis of the heliostat support frame, the second end of the second linear actuator attaching to the heliostat support frame.

3. The drive tracking system of claim 1, wherein the plurality of linear actuators has at least two rotation points, the first linear actuator controlling an elevation rotation of the heliostat facet, the second linear actuator controlling an azimuth rotation of the heliostat facet.

4. The drive tracking system of claim 1, wherein the heliostat facet is a planar surface.

5. The drive tracking system of claim 1, wherein the plurality of linear actuators is powered by a plurality of induction motors.

6. The drive tracking system of claim 1, wherein in the heliostat support frame comprises:

a rotation joint, a rod, and a foundation base, wherein the rotation joint connects across the underside of the heliostat facet, wherein the rod has a top connection point and a bottom connection point, the top connection point fixed to the rotation joint, the bottom connection point fixed to the foundation base, the rod being attached on an axis perpendicular to the foundation base.

7. The drive tracking system of claim 1, wherein the three-axis gyroscopic sensor operates in a power range of 3 volts to 5 volts.

8. The drive tracking system of claim 1, wherein the plurality of DC choppers is based on silicon carbide discreet switches.

9. A method of closed-loop heliostat control with the drive tracking system of claim 1, comprising:

determining an orientation of the heliostat facet with the three-axis gyroscope;

transferring the orientation of the heliostat facet to the circuitry of the microcontroller, outputting, with the microcontroller, a pulse-width modulation signal to the plurality of DC choppers, altering the speed of the plurality of linear actuators with the plurality of DC choppers in response to the pulse-width modulation signal, thereby changing the elevation, and the azimuth of the heliostat facet, the elevation and the azimuth determining the orientation of the heliostat facet.

10. The method of closed-loop heliostat control of claim 9, wherein the microcontroller receives a first signal and a second signal, wherein the first signal is a feedback signal produced by the three-axis gyroscope, wherein the second signal comprises a location data point and a time data point produced by a global positioning system (GPS), wherein the GPS is fixed to the rear surface of the heliostat facet, the GPS being wired to the microcontroller.

11. The method of closed-loop heliostat control of claim 10, wherein an orientation of the heliostat facet is processed by the circuitry of the microcontroller, the circuitry of the microcontroller calculating the orientation of the heliostat facet, the orientation maximizing a sunbeam reflection to the solar power tower.

12. The method of closed-loop heliostat control of claim 9, wherein the pulse-modulation signal comprises two states, a first state extending the plurality of linear actuators, a second state retracting the plurality of linear actuators.

13. The method of closed-loop heliostat control of claim 9, wherein the orientation of the heliostat is altered according to a time-step.

* * * * *